(12) United States Patent
Cutsforth

(10) Patent No.: US 12,015,229 B2
(45) Date of Patent: Jun. 18, 2024

(54) BRUSH HOLDER ASSEMBLY

(71) Applicant: CUTSFORTH, INC., Minneapolis, MN (US)

(72) Inventor: Robert S. Cutsforth, Bellingham, WA (US)

(73) Assignee: CUTSFORTH, INC., Minneapolis, MN (US)

( * ) Notice: Subject to any disclaimer, the term of this patent is extended or adjusted under 35 U.S.C. 154(b) by 60 days.

(21) Appl. No.: 17/517,070

(22) Filed: Nov. 2, 2021

(65) Prior Publication Data

US 2022/0140557 A1 May 5, 2022

Related U.S. Application Data

(60) Provisional application No. 63/109,455, filed on Nov. 4, 2020.

(51) Int. Cl.
*H01R 39/38* (2006.01)
*H01R 39/415* (2006.01)
*H02K 5/14* (2006.01)

(52) U.S. Cl.
CPC ......... *H01R 39/385* (2013.01); *H01R 39/415* (2013.01); *H02K 5/14* (2013.01)

(58) Field of Classification Search
CPC .... H01R 39/385; H01R 39/415; H01R 39/58; H01R 39/42; H01R 43/14; H02K 5/14
See application file for complete search history.

(56) References Cited

U.S. PATENT DOCUMENTS

| 629,418 | A | 7/1899 | Baylis |
| 985,951 | A | 3/1911 | Sparks |
| 1,132,304 | A | 3/1915 | Cunningham |
| 1,355,254 | A | 10/1920 | Parsons |
| 1,366,404 | A | 1/1921 | MacDougall |

(Continued)

FOREIGN PATENT DOCUMENTS

| CN | 211295649 U | 8/2020 |
| DE | 19943306 A1 | 4/2000 |

(Continued)

OTHER PUBLICATIONS

General Electric Company, "Collector and Carbon Brush Rigging Installation," Operation and Maintenance, (Revised May 2009).

(Continued)

*Primary Examiner* — Christopher M Koehler
*Assistant Examiner* — Viswanathan Subramanian
(74) *Attorney, Agent, or Firm* — Seager, Tufte & Wickhem LLP

(57) ABSTRACT

An example brush holder assembly for positioning a conductive carbon brush in contact with a conductive surface of an electrical device is disclosed. In some aspects, the example brush holder assembly includes a brush holder including a backbone extending therefrom and a removable handle. Further, the removeable handle includes a frame releasably engaged with the backbone and a grip secured to the frame. In some aspects, the brush holder assembly includes a removable catch arm removably coupled to an upper beam and a lower beam of the brush holder assembly. Removal of the catch arm allows the upper beam to be disassembled from the lower beam.

12 Claims, 27 Drawing Sheets

(56) References Cited

U.S. PATENT DOCUMENTS

| | | |
|---|---|---|
| 1,488,574 A | 4/1924 | Wagner |
| 1,488,575 A | 4/1924 | Wagner |
| 2,194,620 A | 3/1940 | Sekyra |
| 2,840,732 A | 6/1958 | Nottelmann et al. |
| 2,840,734 A | 6/1958 | Nottelmann et al. |
| 3,316,431 A | 4/1967 | Manoni |
| 3,346,431 A | 10/1967 | Hammonds |
| 3,387,155 A | 6/1968 | Krulls |
| 3,432,708 A | 3/1969 | Bissett |
| 3,445,705 A | 5/1969 | Fuller et al. |
| 3,466,481 A | 9/1969 | Sckerl |
| 3,482,135 A | 12/1969 | Hurlin |
| 3,521,102 A | 7/1970 | Kumar |
| 3,590,298 A | 6/1971 | Hudak |
| 3,656,018 A | 4/1972 | Maher |
| 3,710,160 A | 1/1973 | Voglesonger |
| 3,710,478 A | 1/1973 | Krulls |
| 3,842,302 A | 10/1974 | Apostoleris |
| 3,863,085 A | 1/1975 | Shapiro et al. |
| 3,864,803 A | 2/1975 | Ohmstedt et al. |
| 3,867,659 A | 2/1975 | Seaburg |
| 3,898,492 A | 8/1975 | Vassos et al. |
| 3,902,088 A | 8/1975 | Guglielmo |
| 3,967,148 A | 6/1976 | Walsh |
| 3,968,391 A | 7/1976 | Blank |
| 3,983,432 A | 9/1976 | Rankin |
| 4,074,162 A | 2/1978 | Parzych |
| 4,082,975 A | 4/1978 | Azarov et al. |
| 4,166,968 A | 9/1979 | Prittie |
| 4,296,346 A | 10/1981 | Ooki et al. |
| 4,297,605 A | 10/1981 | Tak |
| 4,329,611 A | 5/1982 | Ohmstedt et al. |
| 4,329,612 A | 5/1982 | Averill |
| 4,340,832 A | 7/1982 | Cheetham et al. |
| 4,354,128 A | 10/1982 | Chew et al. |
| 4,355,254 A | 10/1982 | Oki et al. |
| 4,366,404 A | 12/1982 | Ziegler |
| 4,409,508 A | 10/1983 | Ooki et al. |
| 4,420,705 A | 12/1983 | Kimberlin |
| 4,513,395 A | 4/1985 | Henry et al. |
| 4,513,495 A | 4/1985 | Kimberlin |
| 4,633,552 A | 1/1987 | Eriksson |
| 4,663,552 A | 5/1987 | Ohmstedt |
| 4,843,274 A | 6/1989 | Paisley |
| 5,043,619 A | 8/1991 | Kartman, Jr. |
| 5,159,222 A | 10/1992 | Southall |
| 5,168,620 A | 12/1992 | Denney et al. |
| 5,256,925 A | 10/1993 | Cutsforth |
| 5,368,427 A * | 11/1994 | Pfaffinger ............... F16B 21/04 24/DIG. 54 |
| 5,414,319 A | 5/1995 | Nowicki et al. |
| 5,444,320 A | 8/1995 | Clarke et al. |
| 5,608,280 A | 3/1997 | Tamemoto et al. |
| 5,648,695 A | 7/1997 | Yamaguchi et al. |
| 5,731,650 A | 3/1998 | Scheucher |
| 5,819,092 A | 10/1998 | Ferguson et al. |
| 5,939,812 A | 8/1999 | Wetzel |
| 5,949,175 A | 9/1999 | Cummins |
| 6,087,754 A | 7/2000 | Berger |
| 6,124,652 A | 9/2000 | Karasa et al. |
| 6,133,665 A | 10/2000 | Prell et al. |
| 6,169,351 B1 | 1/2001 | Bohart et al. |
| 6,246,145 B1 | 6/2001 | Morimoto et al. |
| 6,246,146 B1 | 6/2001 | Schiller |
| 6,255,955 B1 | 7/2001 | Blaettner |
| 6,326,716 B1 | 12/2001 | Niimi et al. |
| 6,356,004 B1 | 3/2002 | Porter et al. |
| 6,515,989 B1 | 2/2003 | Rönneke |
| 6,600,744 B1 | 7/2003 | Carr et al. |
| 6,618,355 B1 | 9/2003 | Gulliford et al. |
| 6,636,502 B1 | 10/2003 | Lager et al. |
| 6,680,556 B2 | 1/2004 | Menz et al. |
| 6,738,752 B2 | 5/2004 | Sako et al. |
| 6,824,577 B2 | 11/2004 | Deshpande |
| 6,960,922 B2 | 11/2005 | Klaar |
| 7,034,430 B2 | 4/2006 | Custforth et al. |
| 7,053,516 B2 | 5/2006 | Yu |
| 7,122,935 B2 | 10/2006 | Custforth et al. |
| 7,141,906 B2 | 11/2006 | Custforth et al. |
| 7,218,028 B2 | 5/2007 | Annis et al. |
| 7,365,470 B1 | 4/2008 | Eger et al. |
| 7,417,354 B2 | 8/2008 | Cutsforth et al. |
| 7,545,072 B2 | 6/2009 | Cutsforth |
| 7,564,160 B2 | 7/2009 | Cutsforth et al. |
| 7,608,970 B2 | 10/2009 | Eger et al. |
| 7,705,744 B2 | 4/2010 | Cutsforth |
| 7,768,174 B2 | 8/2010 | Cutsforth et al. |
| 7,816,834 B2 | 10/2010 | Cutsforth |
| 7,880,362 B2 | 2/2011 | Cutsforth et al. |
| 7,880,363 B2 | 2/2011 | Cutsforth et al. |
| 7,916,038 B2 | 3/2011 | Cutsforth |
| 7,960,892 B2 | 6/2011 | Cutsforth |
| 7,990,018 B2 | 8/2011 | Cutsforth et al. |
| 7,994,683 B2 | 8/2011 | Cutsforth et al. |
| 8,049,392 B2 | 11/2011 | Quail et al. |
| 8,134,472 B2 | 3/2012 | Cutsforth |
| 8,179,014 B2 | 5/2012 | Cutsforth et al. |
| 8,546,993 B2 | 10/2013 | Cutsforth et al. |
| 8,618,943 B2 | 12/2013 | Cutsforth et al. |
| 8,825,800 B2 | 9/2014 | Cutsforth |
| 8,922,092 B2 | 12/2014 | Cutsforth |
| 9,178,327 B2 | 11/2015 | Cutsforth |
| 9,252,643 B2 | 2/2016 | Cutsforth |
| 9,287,674 B2 | 3/2016 | Cutsforth et al. |
| 9,287,675 B2 | 3/2016 | Cutsforth et al. |
| 9,287,676 B2 | 3/2016 | Cutsforth et al. |
| 9,293,879 B2 | 3/2016 | Cutsforth et al. |
| 9,293,880 B2 | 3/2016 | Cutsforth et al. |
| 9,293,881 B2 | 3/2016 | Cutsforth et al. |
| 9,350,130 B2 | 5/2016 | Cutsforth et al. |
| 9,590,375 B2 | 3/2017 | Cutsforth et al. |
| 9,590,376 B2 | 3/2017 | Cutsforth |
| 9,640,930 B2 | 5/2017 | Cutsforth |
| 9,917,408 B2 | 3/2018 | Cutsforth |
| 10,199,790 B2 | 2/2019 | Cutsforth et al. |
| 10,249,999 B2 | 4/2019 | Cutsforth |
| RE47,563 E | 8/2019 | Cutsforth |
| 10,790,629 B2 | 9/2020 | Cutsforth |
| 11,211,757 B2 | 12/2021 | Cutsforth et al. |
| 2003/0151328 A1 | 8/2003 | Cutsforth et al. |
| 2003/0173856 A1 | 9/2003 | Raye et al. |
| 2005/0156477 A1 | 7/2005 | Bocka et al. |
| 2006/0112584 A1 | 6/2006 | Jones |
| 2006/0119211 A1 | 6/2006 | Annis et al. |
| 2008/0197745 A1* | 8/2008 | Eger .................... H01R 39/42 310/240 |
| 2010/0133950 A1 | 6/2010 | Custforth et al. |
| 2015/0137656 A1 | 2/2015 | Cutsforth et al. |
| 2015/0137657 A1 | 2/2015 | Cutsforth et al. |
| 2015/0143689 A1 | 5/2015 | Cutsforth et al. |
| 2015/0171583 A1 | 6/2015 | Cutsforth et al. |
| 2015/0180191 A1 | 6/2015 | Cutsforth et al. |
| 2015/0180318 A1 | 6/2015 | Cutsforth et al. |
| 2020/0112223 A1 | 4/2020 | Cutsforth et al. |
| 2020/0388974 A1 | 12/2020 | Cutsforth |

FOREIGN PATENT DOCUMENTS

| | | |
|---|---|---|
| EP | 847126 A1 | 6/1998 |
| EP | 1026853 A1 | 8/2000 |
| EP | 2639897 A2 | 9/2013 |
| FR | 2246994 A1 | 5/1975 |
| FR | 2329087 A1 | 5/1977 |
| JP | H1013808 A | 1/1998 |
| JP | H1166182 A | 3/1999 |
| JP | H1174882 A | 3/1999 |
| JP | 2000101573 A | 4/2000 |
| JP | 2001067401 A | 3/2001 |

(56) References Cited

FOREIGN PATENT DOCUMENTS

| WO | 0133800 A1 | 5/2001 |
|---|---|---|
| WO | 0191003 A2 | 11/2001 |

OTHER PUBLICATIONS

Gere et al., "Mechanics of Materials," Second Edition, pp. 1-26, 1984.
Hall et al.,"Carbon Brush Performance on Slip Rings," Proc. Conf. Rec. Annu. Pulp Paper Ind. Tech. Conf., pp. 1-6, 2010.
Koenitzer, "Brushholders and the Performance of Carbon Brushes," Electrical Apparatus Service Association, Inc., Tech Note No. 22, 2003.
Joint Claim Construction Statement filed May 3, 2013 in Case No. 0:12-CV-01200 SRN-JSM in Dist. Court of MN.
Lemm's Answer and Counterclaims to Cutsforth's Second Amended Complaint filed Oct. 9, 2012 in Case No. 0:12-CV-01200 SRN-JSM in Dist. Court of MN.
Memorandum Opinion and Order filed Jun. 6, 2013 in Case No. 0:12-CV-01200 SRN-JSM in Dist. Court of MN.
Motivepower's Answer and Counterclaims to Cutsforth's Second Amended Complaint filed Oct. 9, 2012 in Case No. 0:12-CV-01200 SRN-JSM in Dist. Court of MN.
Ohmstedt et al., "Maintaining Carbon-Brush Collectors," Power, Jun. 1976.
Oxford Dictionary of Mechanical Engineering, 4 pages, 2013.
Parslow, "Improved Safety of Carbon-Brush Collector Maintenance on Turbine-Generators Retrofitted With On-Line, Removable Plug-In Brush Holders," Energy-Tech.com pp. 1-5, Jun. 2010.
Patent Owner Cutsforth, Inc.'s Motion to Amend U.S. Pat. No. 7,141,906 Under 35 U.S.C. Section 316 and 37 CFR Section 42.121 dated Feb. 6, 2014, in Case IPR2013-00268 for U.S. Pat. No. 7,141,906.
Patent Owner Cutsforth, Inc.'s Motion to Amend U.S. Pat. No. 7,417,354 Under 35 U.S.C. Section 316 and 37 CFR Section 42.121 dated Feb. 6, 2014, in Case IPR2013-00270 for U.S. Pat. No. 7,417,354.
Patent Owner Cutsforth, Inc.'s Motion to Amend U.S. Pat. No. 8,179,014 Under 35 U.S.C. Section 316 and 37 CFR Section 42.121 dated Feb. 6, 2014, in Case IPR2013-00272 for U.S. Pat. No. 8,179,014.
Patent Owner Cutsforth, Inc.'s Preliminary Response filed Aug. 6, 2013 in Case IPR2013-00267 for U.S. Pat. No. 7,122,935.
Patent Owner Cutsforth, Inc.'s Preliminary Response filed Aug. 6, 2013 in Case IPR2013-00268 for U.S. Pat. No. 7,141,906.
Patent Owner Cutsforth, Inc.'s Preliminary Response filed Aug. 6, 2013 in Case IPR2013-00270 for U.S. Pat. No. 7,417,354.
Patent Owner Cutsforth, Inc.'s Preliminary Response filed Aug. 8, 2013 in Case IPR2013-00272 for U.S. Pat. No. 8,179,014.
Patent Owner Cutsforth, Inc.'s Preliminary Response filed Aug. 8, 2013 in Case IPR2013-00274 for U.S. Pat. No. 7,990,018.
Patent Owner Cutsforth, Inc.'s Response dated Feb. 6, 2014 in Case IPR2013-00267 for U.S. Pat. No. 7,122,935.
Patent Owner Cutsforth, Inc.'s Response dated Feb. 6, 2014 in Case IPR2013-00270 for U.S. Pat. No. 7,417,354.
Patent Owner Cutsforth, Inc.'s Response dated Feb. 6, 2014 in Case IPR2013-00272 for U.S. Pat. No. 8,179,014.
Patent Owner Cutsforth, Inc.'s Response dated Feb. 6, 2014 in Case IPR2013-00274 for U.S. Pat. No. 7,990,018.
Patent Owner Cutsforth, Inc.'s Response filed Feb. 6, 2014 in Case IPR2013-00268 for U.S. Pat. No. 7,141,906.
Petition for Inter Partes Review of U.S. Pat. No. 7,122,935 filed with the United States Patent and Trademark Office on May 6, 2013.
Petition for Inter Partes Review of U.S. Pat. No. 7,141,906 filed with the United States Patent and Trademark Office on May 6, 2013.
Petition for Inter Partes Review of U.S. Pat. No. 7,417,354 filed with the United States Patent and Trademark Office on May 6, 2013.
Petition for Inter Partes Review of U.S. Pat. No. 7,990,018 filed with the United States Patent and Trademark Office on May 8, 2013.
Petition for Inter Partes Review of U.S. Pat. No. 8,179,014 filed with the United States Patent and Trademark Office on May 8, 2013.
Petitioner's Reply to Patent Owner's Response dated May 6, 2014 for Case IPR2013-00267 for U.S. Pat. No. 7,122,935.
Petitioner's Reply to Patent Owner's Response dated May 6, 2014 for Case IPR2013-00268 for U.S. Pat. No. 7,141,906.
Petitioner's Reply to Patent Owner's Response dated May 6, 2014 for Case IPR2013-00270 for U.S. Pat. No. 7,417,354.
Petitioner's Reply to Patent Owner's Response dated May 6, 2014 for Case IPR2013-00272 for U.S. Pat. No. 8,179,014.
Petitioner's Reply to Patent Owner's Response dated May 6, 2014 for Case IPR2013-00274 for U.S. Pat. No. 7,990,018.
Plaintiff Cutsforth, Inc.'s Amended Complaint filed Jul. 13, 2012 in Case No. 0:12-CV-01200 SRN-ISM in Dist. Court Df MN.
Plaintiff Cutsforth, Inc.'s Answer to Amended Counterclaims of Fulmer Company, LLC filed Oct. 26, 2012 in Case No. 0:12-CV-01200 SRN-JSM in Dist. Court of MN.
Plaintiff Cutsforth, Inc.'s Answer to Counterclaims of Fulmer Company, LLC filed Jul. 30, 2012 in Case No. 0:12-CV-01200 SRN-JSM in Dist. Court of MN.
Plaintiff Cutsforth, Inc.'s Answer to Counterclaims of Motivepower, Inc. filed Oct. 26, 2012 in Case No. 0:12-CV-01200 SRN-JSM in Dist. Court of MN.
Plaintiff Cutsforth, Inc.'s Answer to Counterclaims of Wabtec filed Jul. 30, 2012 in Case No. 0:12-CV-01200 SRN-JSM in Dist. Court of MN.
Plaintiff Cutsforth, Inc.'s Answer to Defendants' First Set of Interrogatories filed Sep. 24, 2012 in Case No. 0:12-CV-01200 SRN-JSM in Dist. Court of MN.
Plaintiff Cutsforth, Inc.'s Answer to Wabtec's Amended Counterclaims filed Oct. 26, 2012 in Case No. 0:12-CV-01200 SRN-JSM in Dist. Court of MN.
Plaintiff Cutsforth, Inc.'s Complaint filed May 17, 2012 in Case No. 0:12-CV-01200 SRN-JSM in Dist. Court of MN.
Plaintiff Cutsforth, Inc.'s Final Infringement Contentions filed May 10, 2013 in Case No. 0:12-CV-01200 SRN-ISM in Dist. Court of MN.
Plaintiff Cutsforth, Inc.'s First Supplemental Response to Defendants' First Set of Interrogatories filed Oct. 26, 2012 in Case No. 0:12-CV-01200 SRN-JSM in Dist. Court of MN.
Plaintiff Cutsforth, Inc.'s Memorandum in Support of Its Motion to Dismiss Inequitable Conduct Pleadings filed Oct. 26, 2012 in Case No. 0:12-CV-01200 SRN-JSM in Dist. Court of MN.
Plaintiff Cutsforth, Inc.'s Reply Memorandum in Support of Its Motion to Dismiss Inequitable Conduct Pleadings (Redacted Version) filed Dec. 3, 2012 in Case No. 0:12-CV-01200 SRN-JSM in Dist. Court of MN.
Plaintiff Cutsforth, Inc.'s Response to Defendants' Preliminary Invalidity Contentions filed Dec. 21, 2012, in Case No. 0:12-CV-01200 SRN-JSM in Dist. Court of MN.
Plaintiff Cutsforth, Inc.'s Second Amended Complaint filed Sep. 25, 2012 in Case No. 0:12-CV-01200 SRN-JSM in Dist. Court of MN.
Claim Chart of U.S. Pat. No. 7,122,935, filed as Exhibit 2014 with Patent Owner Cutsforth, Inc.'s Response dated Feb. 6, 2014 in Case IPR2013-00267 for U.S. Pat. No. 7,122,935.
Claim Chart of U.S. Pat. No. 7,417,354, filed as Exhibit 2014 with Patent Owner Cutsforth, Inc.'s Response dated Feb. 6, 2014 in Case IPR2013-00270 for U.S. Pat. No. 7,417,354.
Claim Chart of U.S. Pat. No. 7,990,018, filed as Exhibit 2017 with Patent Owner Cutsforth, Inc.'s Response dated Feb. 6, 2014 in Case IPR2013-00274 for U.S. Pat. No. 7,990,018.
Claim Chart of U.S. Pat. No. 8,179,014, filed as Exhibit 2014 with Patent Owner Cutsforth, Inc.'s Response dated Feb. 6, 2014 in Case IPR2013-00272 for U.S. Pat. No. 8,179,014.
Maughan, "Recent Publications," retrieved from internet: http://home.earthlink.net/.about.theclyde/Publications.html retrieved on Feb. 1, 2014 (Dec. 17, 2013).
Maughan, "Maintaining Carbon-Brush Collectors," Combined Cycle Journal, pp. 98-104, 2010.
Maughan, "Carbon Brush Collector Maintenance on Turbine-Generators," IEEE, pp. 57-62, 2007.
Cutsforth PrelimInfringement Contentions w-Exs A-E Oct. 5, 2012 filed in Case No. 0:12-cv-01200 in Dist. Court of MN.

(56) References Cited

OTHER PUBLICATIONS

Cutsforth Resp to Defs Invalidity Contentions Dec. 21, 2012 filed in Case No. 0:12-cv-01200 in Dist. Court of MN.
Decision Institution of Inter Partes Review dated Nov. 1, 2013 for Case IPR2013-00267 for U.S. Pat. No. 7,122,935.
Decision Institution of Inter Partes Review dated Nov. 1, 2013 for Case IPR2013-00268 for U.S. Pat. No. 7,141,906.
Decision Institution of Inter Partes Review entered Nov. 1, 2013 for Case IPR2013-00270 for U.S. Pat. No. 7,417,354.
Decision Institution of Inter Partes Review entered Nov. 1, 2013 for Case IPR2013-00272 for U.S. Pat. No. 8,179,014.
Decision Institution of Inter Partes Review entered Nov. 1, 2013 for Case IPR2013-00274 for U.S. Pat. No. 7,990,018.
Decision on Motion to Amend Claims entered Feb. 18, 2014 in Case IPR2013-00268 for U.S. Pat. No. 7,141,906.
Decision on Motion to Amend Claims entered Feb. 18, 2014 in Case IPR2013-00270 for U.S. Pat. No. 7,417,354.
Decision on Motion to Amend Claims entered Feb. 18, 2014 in Case IPR2013-00272 for U.S. Pat. No. 8,179,014.
Declaration of Dustin Cutsforth, dated Feb. 6, 2014, in Case IPR2013-00267 for U.S. Pat. No. 7,122,935.
Declaration of Dustin Cutsforth, dated Feb. 6, 2014, in Case IPR2013-00270 for U.S. Pat. No. 7,417,354.
Declaration of Dustin Cutsforth, dated Feb. 6, 2014, in Case IPR2013-00272 for U.S. Pat. No. 8,179,014. xx.
Declaration of Dustin Cutsforth, dated Feb. 6, 2014, in Case IPR2013-00274 for U.S. Pat. No. 7,990,018.
Declaration of Jason A. Engel in Support of Defendants' Opposition to Motion to Dismiss filed Nov. 16, 2012 in Case No. 0:12-CV-01200 SRN-JSM in Dist. Court of MN.
Declaration of Joseph A. Herriges in Support of Plaintiff Cutsforth, Inc.'s Memorandum of Law in Support of Its Motion to Dismiss Inequitable Conduct Pleadings filed Oct. 26, 2012 in Case No. 0:12-CV-01200 SRN-JSM in Dist. Court of MN.
Declaration of Thomas A. Keim, Sc.D., dated Feb. 6, 2014, in Case IPR2013-00267 for U.S. Pat. No. 7,122,935.
Declaration of Thomas A. Keim, Sc.D., dated Feb. 6, 2014, in Case IPR2013-00268 for U.S. Pat. No. 7,141,906.
Declaration of Thomas A. Keim, Sc.D., dated Feb. 6, 2014, in Case IPR2013-00270 for U.S. Pat. No. 7,417,354.
Declaration of Thomas A. Keim, Sc.D., dated Feb. 6, 2014, in Case IPR2013-00272 for U.S. Pat. No. 8,179,014.
Declaration of Thomas A. Keim, Sc.D., dated Feb. 6, 2014, in Case IPR2013-00274 for U.S. Pat. No. 7,990,018.
Defendants' Opposition to Motion to Dismiss filed Nov. 16, 2012 in Case No. 0:12-CV-01200 SRN-JSM in Dist. court of MN.
Defendant's Preliminary Non-Infringement, Unenforceability and Invalidity Contentions filed Nov. 9, 2012 in Case No. 0:12-CV-01200 SRN-JSM in Dist. Court of MN.
Defendants' Unenforceability and Invalidity Contentions filed May 8, 2013 in Case No. 0:12-CV-01200 SRN-JSM in Dist. Court of MN.
Defendant's Unenforceability and Invalidity Contentions, filed May 10, 2013 in Case No. 0:12-CV-01200-SRN-JSM in Dist. Court of MN.
Defs Exs 1-5 to Non-Infringe Contentions Nov. 9, 2012 filed in Case No. 0-12-cv-01200 in Dist. Court of MN.
Defs Exs A-E to Invalidity Contents Nov. 9, 2012 filed in Case No. 0:12-cv-01200 in Dist. Court of MN.
Defs Non-Infringe-Invalidity Contentions Nov. 9, 2012 filed in Case No. 0:12-cv-1200 in Dist. Court of MN.
Documents depicting brush holder designs, sent by applicant on Apr. 5, 2002 (3 pgs).
Documents depicting various processes of electropolishing, sent by applicant on Dec. 17, 2002 (3 pgs).
Final Written Decision entered Oct. 30, 2014 in Case IPR2013-00267 for U.S. Pat. No. 7,122,935.
Final Written Decision entered Oct. 30, 2014 in Case IPR2013-00268 for U.S. Pat. No. 7,141,906.
Final Written Decision entered Oct. 30, 2014 in Case IPR2013-00270 for U.S. Pat. No. 7,417,354.
Final Written Decision entered Oct. 30, 2014 in Case IPR2013-00272 for U.S. Pat. No. 8,179,014.
Final Written Decision entered Oct. 30, 2014 in Case IPR2013-00274 for U.S. Pat. No. 7,990,018.
Fulmer's Answer and Counterclaims filed Jul. 6, 2012 in Case No. 0:12-CV-01200 SRN-JSM in Dist. Court of MN.
Fulmer's Answer and Counterclaims to Cutsforth's Amended Complaint filed Jul. 27, 2012 in Case No. 0:12-CV-01200 SRN-JSM in Dist. Court of MN.
GE Industrial & Power Systems, "Collectors, Brush Rigging, Cartridge Brush Holders and Brushes," pp. 1-30, revised Oct. 1992.
GE Power Systems, "Brush Rigging and Collector Rings," pp. 1-8, Revised Jul. 1994.
Roark et al., "Formulas for Stress and Strain," Fifth Edition, pp. 89-205, 1975.
Supplemental Declaration of Thomas A. Keim, Sc.D, dated Feb. 28, 2014 in Case IPR2013-00267 for U.S. Pat. No. 7,122,935.
Supplemental Declaration of Thomas A. Keim, Sc.D, dated Feb. 28, 2014 in Case IPR2013-00268 for U.S. Pat. No. 7,141,906.
Supplemental Declaration of Thomas A. Keim, Sc.D, dated Feb. 28, 2014 in Case IPR2013-00270 for U.S. Pat. No. 7,417,354.
Supplemental Declaration of Thomas A. Keim, Sc.D, dated Feb. 28, 2014 in Case IPR2013-00272 for U.S. Pat. No. 8,179,014.
Supplemental Declaration of Thomas A. Keim, Sc.D, dated Feb. 28, 2014 in Case IPR2013-00274 for U.S. Pat. No. 7,990,018.
The American Heritage Dictionary of the English Language 3rd Ed., Houghton Mifflin Company, 1996.
The American Heritage Dictionary of The English Language Fourth Edition, Houghton Mifflin Company, 4 pages, 2000.
The New Oxford American Dictionary, Oxford University Press, 2001.
Transcript of Hearing on Plaintiff's Motion to Dismiss on Jan. 15, 2013 in Case No. 0:12-CV-01200 SRN-JSM in Dist. Court of MN.
USPTO Final Office Action, in U.S. Appl. No. 11/096,990, dated Dec. 6, 2007, 10 pages.
Wabtec's Answer and Counterclaims filed Jul. 6, 2012 in Case No. 0:12-CV-01200 SRN-JSM in Dist. Court of MN.
Wabtec's Answer and Counterclaims to Cutsforth's Amended Complaint filed Jul. 27, 2012 in Case No. 0:12-CV-01200 SRN-JSM in Dist. Court of MN.
Wabtec's Answer and Counterclaims to Cutsforth's Second Amended Complaint filed Oct. 9, 2012 in Case No. D:12-CV-01200 SRN-JSM in Dist. Court of MN.
Webster's Third New International Dictionary of the English Language Unabridged, 6 pages, 1961.
Webster's Third New International Dictionary of the English Language Unabridged, 3 pages, 1993.
Kikuchi et al; "PDC Packet ido ni okeru kakinsaki seigyo hoshiki", 2000 NEN The Institute of Electronics Information and Communication Engineers Tsushin Society Taikai Koen Ronbunshu 2, p. 28, B-6-28 Sep. 7, 2000. No Document Available.
Hanaoka et al; "I mode service tokushu network hoshiki", NTT Docomo Technical Journal. vol. 7. No. 2, pp. 16-21, 07001,99. Abstract Only.
Yabe; "I mode service tokushi i mode server" NTT Docomo Technical Journal, vol. 7. No. 2, pp. 22-27, Jul. 1, 1999. Abstract Only.
Invitation to Pay Additional Fees for International Application PCT/US2021/057701 dated Feb. 16, 2022.

\* cited by examiner

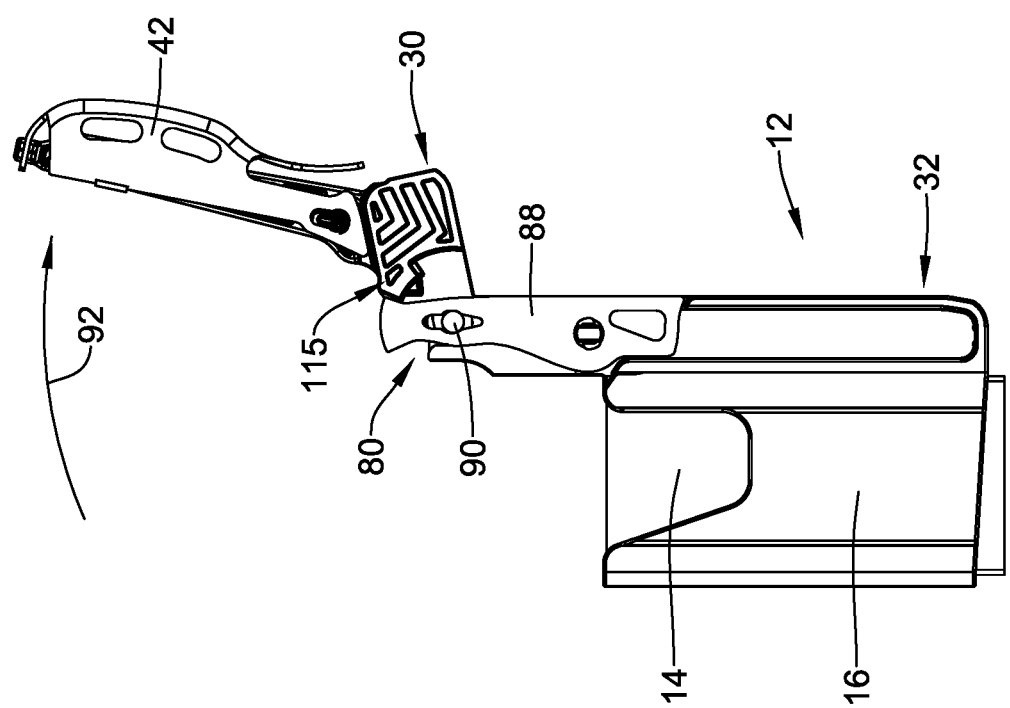

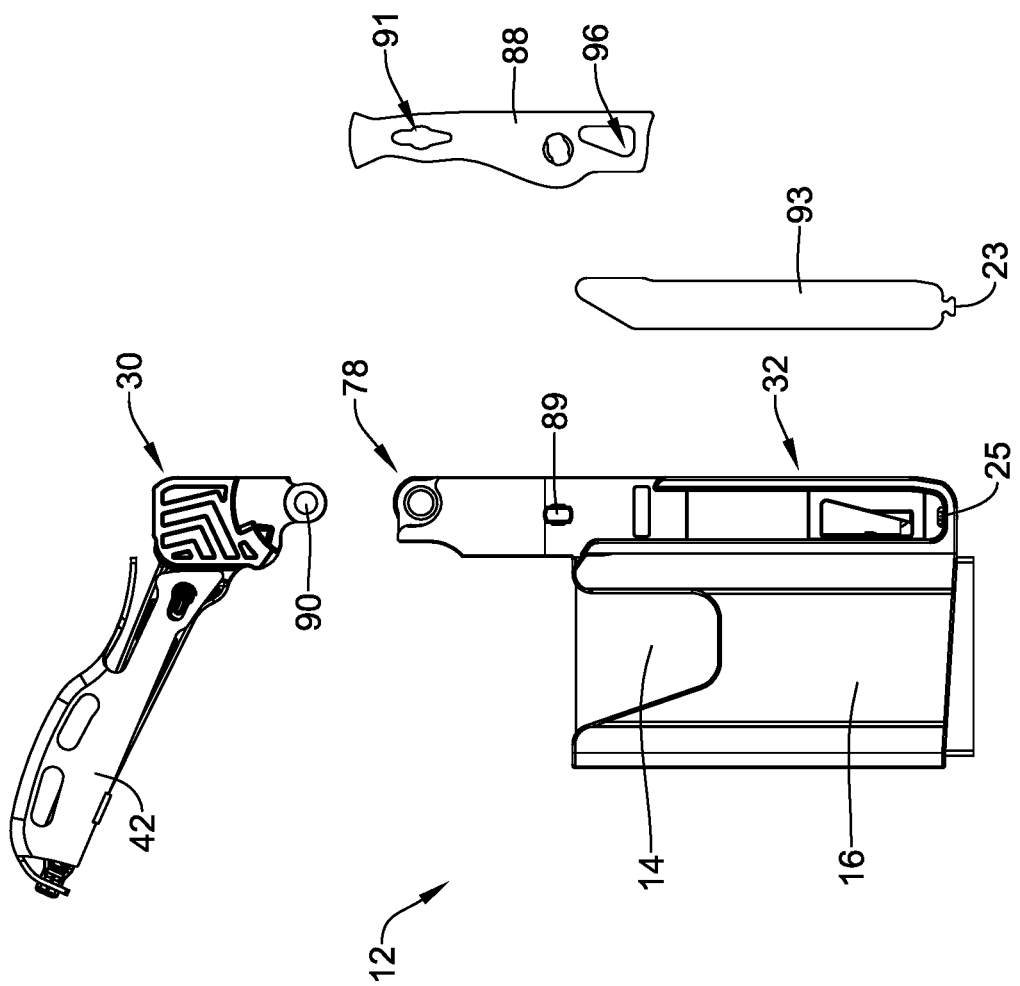

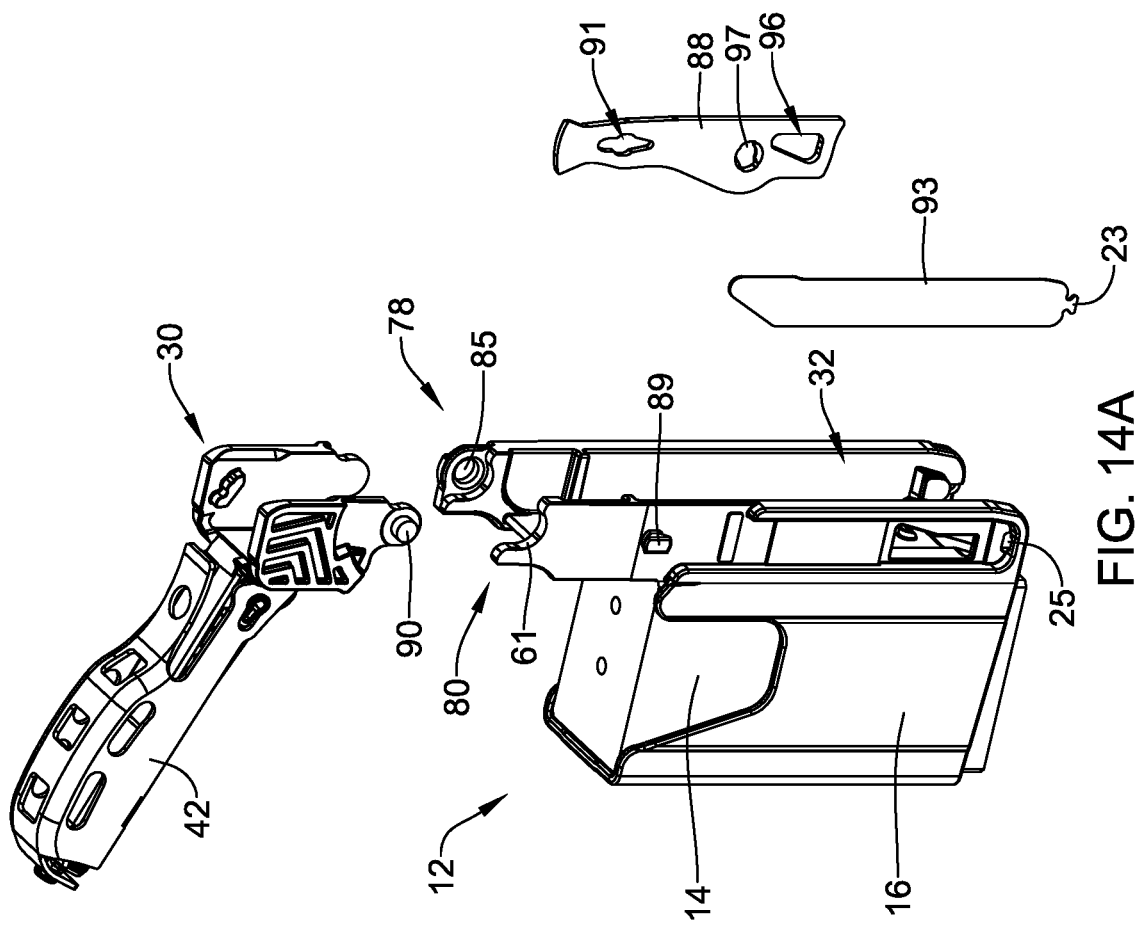

BRUSH HOLDER ASSEMBLY

CROSS-REFERENCE TO RELATED APPLICATIONS

This application claims the benefit of priority under 35 U.S.C. § 119 to U.S. Provisional Application Ser. No. 63/109,455, filed Nov. 4, 2020, the entirety of which is incorporated herein by reference.

TECHNICAL FIELD

The disclosure generally relates to brushes and brush holder assemblies that may be used in electrical devices and/or slip ring assemblies. More specifically, the disclosure relates to a brush holder assembly configured to hold a brush against a moving conductive surface.

BACKGROUND

A purpose of a brush in an electrical device is to pass electrical current from a stationary contact to a moving contact surface, or vice versa. Brushes and brush holders may be used in electrical devices such as electrical generators, electrical motors, and/or slip ring assemblies, or sliding connection applications, for example, slip ring assemblies on a rotating machine such as a rotating crane or a linear sliding connection on a monorail. Brushes in many electrical devices are blocks or other structures made of conductive material, such as graphite, carbon graphite, electrographite, metal graphite, or the like, that are adapted for contact with a conductive surface or surfaces to pass electrical current. Electrically conductive leads or shunts extend from the brush to provide an electrical pathway to and/or from the brush from another conductive member.

In some designs, a brush box type brush holder, or other type of brush holder, may be used to support a brush in contact with a moving contact surface of an electrical device during operation. The brush and brush box may be designed such that the brush can slide within the brush box to provide for continuing contact between the brush and the moving contact surface contacted by the brush. During operation an anomalous and/or threshold condition may occur, which may indicate that one or more components of the electrical device may need to be replaced, one or more components of the electrical device may require inspection or attention, and/or maintenance may need to be performed. For example, an anomalous and/or threshold condition may indicate that one or more of a brush, brush holder, handle assembly, spring and/or other component may need to be replaced, one or more of a brush, brush holder, handle assembly, spring and/or other component may need to be inspected, and/or maintenance may need to be performed. It would be advantageous to design a brush holder assembly which is capable of being disassembled and reassembled such that individual components of the brush holder assembly may be replaced.

SUMMARY

An example brush holder assembly for positioning a conductive carbon brush in contact with a conductive surface of an electrical device includes a brush holder including a backbone extending therefrom and a removable handle. Further, the removeable handle includes a frame releasably engaged with the backbone and a grip secured to the frame.

In addition or alternatively, wherein the frame includes a first aperture in a first end region thereof, and wherein the backbone includes a first projection extending into the first aperture.

In addition or alternatively, wherein the backbone includes second projection on a first side of the backbone and a third projection on a second side of the backbone opposite the first side, and wherein the second projection and the third projection are configured to engage a portion of the frame to secure the removable handle to the backbone.

In addition or alternatively, wherein the frame includes a second end region having a first tab extending along the first side of the backbone and a second tab extending along the second side of the backbone, and wherein the first tab includes a second aperture and the second tab includes a third aperture, and wherein the second projection of the backbone is configured to extend through the second aperture of the frame and the third projection of the backbone is configured to extend through the third aperture of the frame to secure the removable handle to the backbone.

In addition or alternatively, wherein the first tab and the second tab are configured to flex away from backbone to release the second and third projections from the second and third apertures, respectively, for removal of the handle from the backbone.

In addition or alternatively, further comprising a removal tool insertable between the first and second tabs to flex the first and second tabs away from backbone in laterally opposite directions, and wherein flexing the first and second tabs away from backbone releases the frame from the backbone.

In addition or alternatively, wherein the first projection extends into the first aperture such that the first projection engages a peripheral surface of the first aperture to limit the movement of the removable handle relative to the backbone.

In addition or alternatively, wherein the frame includes first and second flanges configured to exert a force on a lower surface of the backbone to limit the relative movement of the removable handle relative to the backbone.

In addition or alternatively, wherein the backbone widens toward a base of the backbone.

In addition or alternatively, wherein at least a portion of the frame is embedded in at least a portion of the grip.

In addition or alternatively, wherein a portion of the grip is compressed between a surface of the frame and a surface of the backbone when the frame is engaged to the backbone.

A removable handle for a brush holder assembly of an electrical device includes a frame formed of a metallic material. Further, the frame is configured to slidably engage a backbone of the brush holder assembly. The removable handle also includes a grip formed of a rubber or polymeric material and the grip is molded around the frame.

In addition or alternatively, wherein the frame includes a first tab extendable along a first side of the backbone and a second tab extendable along a second side of the backbone opposite the first side, and wherein the first tab includes a first aperture and the second tab includes a second aperture, and wherein the first and second apertures are configured to receive first and second projections of the backbone, respectively.

In addition or alternatively, wherein the first tab and the second tab are configured to flex away from backbone to release the first and second projections from the first and second apertures, respectively, for removal of the handle from the backbone.

Another example brush holder assembly includes a lower beam, an upper beam pivotably coupled to the lower beam and a removable catch arm including a first end region and a second end region. Additionally, the first end region of the catch arm is configured to attach to the upper beam and the second end region of the catch arm is configured to attach to the lower beam.

In addition or alternatively, wherein the catch arm further includes a first aperture positioned along the first end region of the catch arm, and wherein the first aperture is configured to receive a pin extending from the upper beam.

In addition or alternatively, wherein the catch arm further includes a second aperture positioned along the second end region of the catch arm, and wherein the second aperture is configured to receive a pin extending from the lower beam.

In addition or alternatively, wherein the second aperture includes a tapered surface, and wherein the pin extending from the lower beam includes a tapered surface configured to mate with the tapered surface of the second aperture.

In addition or alternatively, wherein the second aperture is non-circular, wherein the pin extending from the lower beam is extendable through the second aperture in a first rotational orientation, but is prevented from extending through the second aperture in a second rotational orientation different from the first rotational orientation.

In addition or alternatively, wherein rotation of the catch arm relative to the lower beam about a rotational axis of the pin extending from the lower beam is designed to remove the catch arm from the lower beam.

In addition or alternatively, wherein the first end region of the catch arm includes a first width, and wherein the second end region of the catch arm includes a second width, and wherein the first width is less than the second width.

In addition or alternatively, further comprising a cover plate extending along a side surface of the lower beam, the cover plate including a first end region positioned between the second end region of the catch arm and the side surface of the lower beam.

In addition or alternatively, wherein the end region of the cover plate exerts a lateral outward force against a rear surface of the catch arm.

In addition or alternatively, wherein a second end region of the cover plate includes a tab insertable into a slot of the lower beam.

Another example brush holder assembly includes an upper beam, a lower beam pivotably coupled to the upper beam, a brush holder attached to the lower beam, the brush holder including a first side wall and a second side wall and a carbon brush slidably disposed in the brush holder between the first side wall and the second side wall. Further, the first side wall, the second side wall or both the first side wall and the second side wall include a cut out in an upper edge thereof that extends downward toward a lower edge thereof. Additionally, the brush holder assembly includes a spring including a coiled portion configured to exert a downward force on an upper surface of the carbon brush.

In addition or alternatively, further comprising a wear state monitor disposed within the coiled portion of the spring, wherein at least a portion of the wear state monitor moves below the upper edge as the carbon brush diminishes in length during use thereof.

In addition or alternatively, wherein at least a portion of the wear state monitor is exposed laterally through the cutout when the at least a portion of the wear state monitor is positioned below the upper edge.

In addition or alternatively, wherein the cutout is configured to not obstruct wireless signals to or from the wear state monitor.

Another example brush holder assembly includes an upper beam, a lower beam pivotably coupled to the upper beam and a brush holder attached to the lower beam, the brush holder configured to slidably receive a carbon brush therein. Further, the lower beam includes a first sidewall and a second sidewall defining a channel therebetween, the channel configured to removably receive a mounting block to secure the brush holder assembly to an electrical device. Additionally, the first sidewall includes an opening extending through the sidewall into the channel.

In addition or alternatively, further comprising a removable catch arm including a first end region and a second end region, wherein the first end region of the catch arm is configured to attach to the upper beam and wherein the second end region of the catch arm is configured to attach to the lower beam.

In addition or alternatively, wherein the catch arm further includes a first aperture positioned along the first end region of the catch arm, wherein the first aperture is configured to receive a pin extending from the upper beam and a second aperture positioned along the second end region of the catch arm, wherein the second aperture is configured to receive a pin extending from the lower beam.

In addition or alternatively, further comprising a cover plate extending along the first sidewall of the lower beam, the cover plate including a first end region positioned between the second end region of the catch arm and the first sidewall of the lower beam.

In addition or alternatively, wherein the cover plate extends across the opening of the first sidewall.

In addition or alternatively, wherein the end region of the cover plate exerts a lateral outward force against a rear surface of the catch arm.

In addition or alternatively, wherein a second end region of the cover plate includes a tab insertable into a slot of the lower beam.

The above summary of some embodiments, aspects, and/or examples is not intended to describe each embodiment or every implementation of the present disclosure. The figures and the detailed description which follows more particularly exemplify these embodiments.

BRIEF DESCRIPTION OF THE DRAWINGS

The aspects of the disclosure may be more completely understood in consideration of the following detailed description of various embodiments in connection with the accompanying drawings, in which:

FIG. 12-13 illustrate the pivoting of the upper beam relative to the lower beam of an exemplary brush holder between an engaged, locked position (FIG. 12) and a disengaged, unlocked position (FIG. 13);

FIG. 14 is an exploded view of components of the exemplary brush holder assembly of FIG. 1;

FIG. 14A is a perspective view of the exploded components shown in FIG. 14;

Figure 1:
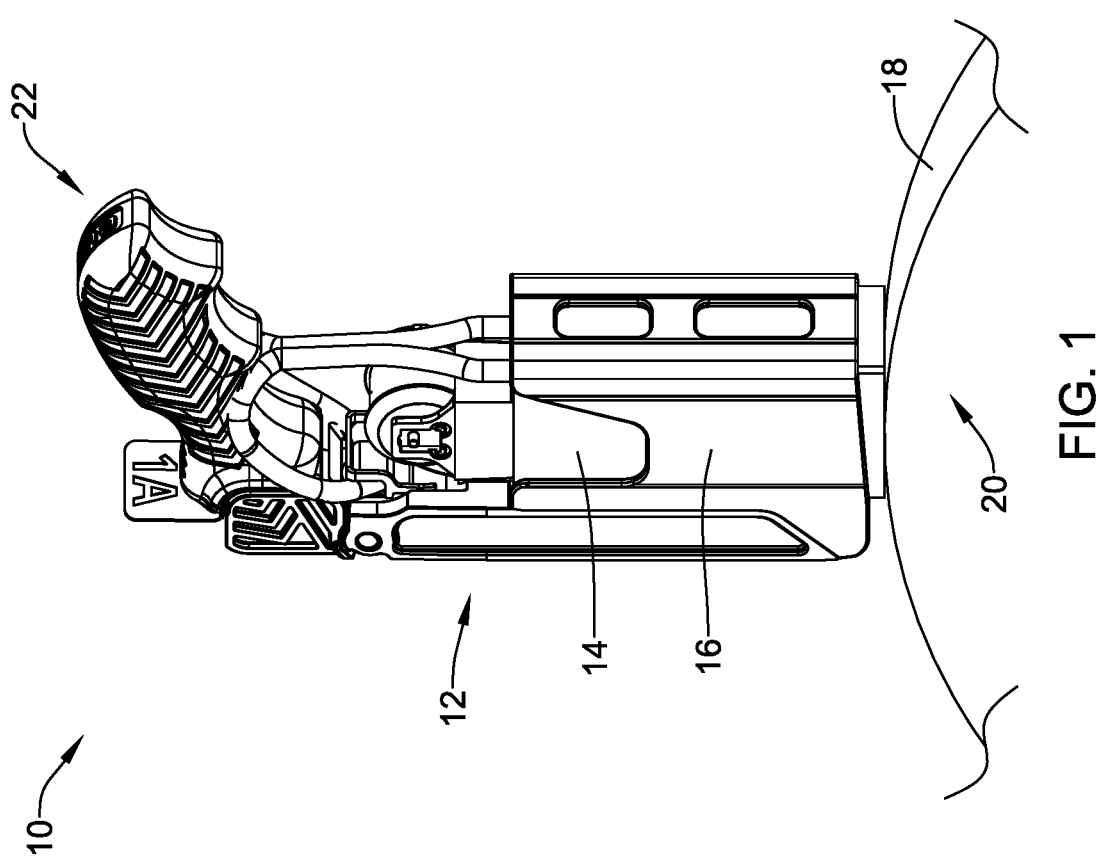
FIG. 1 is an illustrative view of an exemplary brush holder assembly positioned adjacent a rotating component of an electrical machine.

While the aspects of the disclosure are amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions, ranges and/or values pertaining to various components, features and/or specifications are disclosed, one of skill in the art, incited by the present disclosure, would understand desired dimensions, ranges and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

FIG. 1 illustrates an exemplary system 10 that may include a brush holder assembly 12. In some respects, the brush holder assembly 12 may possess similarities of a brush holder assembly as described in U.S. Pat. No. 7,034,430, entitled "BRUSH HOLDER APPARATUS, BRUSH ASSEMBLY, AND METHOD", which is herein incorporated by reference in its entirety. However, the illustrative system 10 includes features as described herein.

FIG. 1 further illustrates that the brush holder assembly 12 may include a brush holder 16 within which a carbon brush 14 is positioned. FIG. 1 illustrates that, in some examples, one or more sides of the brush 14 may be surrounded by the brush holder 16 (e.g., a brush box), whereby the brush holder 16 may include a plurality of guiding surfaces for guiding linear or longitudinal movement of the brush 14 toward the conductive surface 18 of the rotating component 20. In other words, the brush 14 may translate linearly within an aperture defined by the plurality of guiding surfaces of the brush holder 16 as the brush 14 wears. In some embodiments it is contemplated that the brush holder 16 may not take on the form of a box, but may include one or a plurality of guiding surfaces, such as channels, posts or columns, abutting and/or encompassing one or more sides of the brush 14 and/or extending into or through the brush 14, or a portion thereof, for guiding linear or longitudinal movement of the brush 14.

FIG. 1 further illustrates that, in some embodiments, a handle assembly 22 may be coupled to or otherwise provided with the holder assembly 12 (including the brush holder 16) to facilitate engagement and disengagement of the brush 14 from the conductive surface 18. The handle assembly 22 and individual components thereof will be described in greater detail below.

Figure 2:
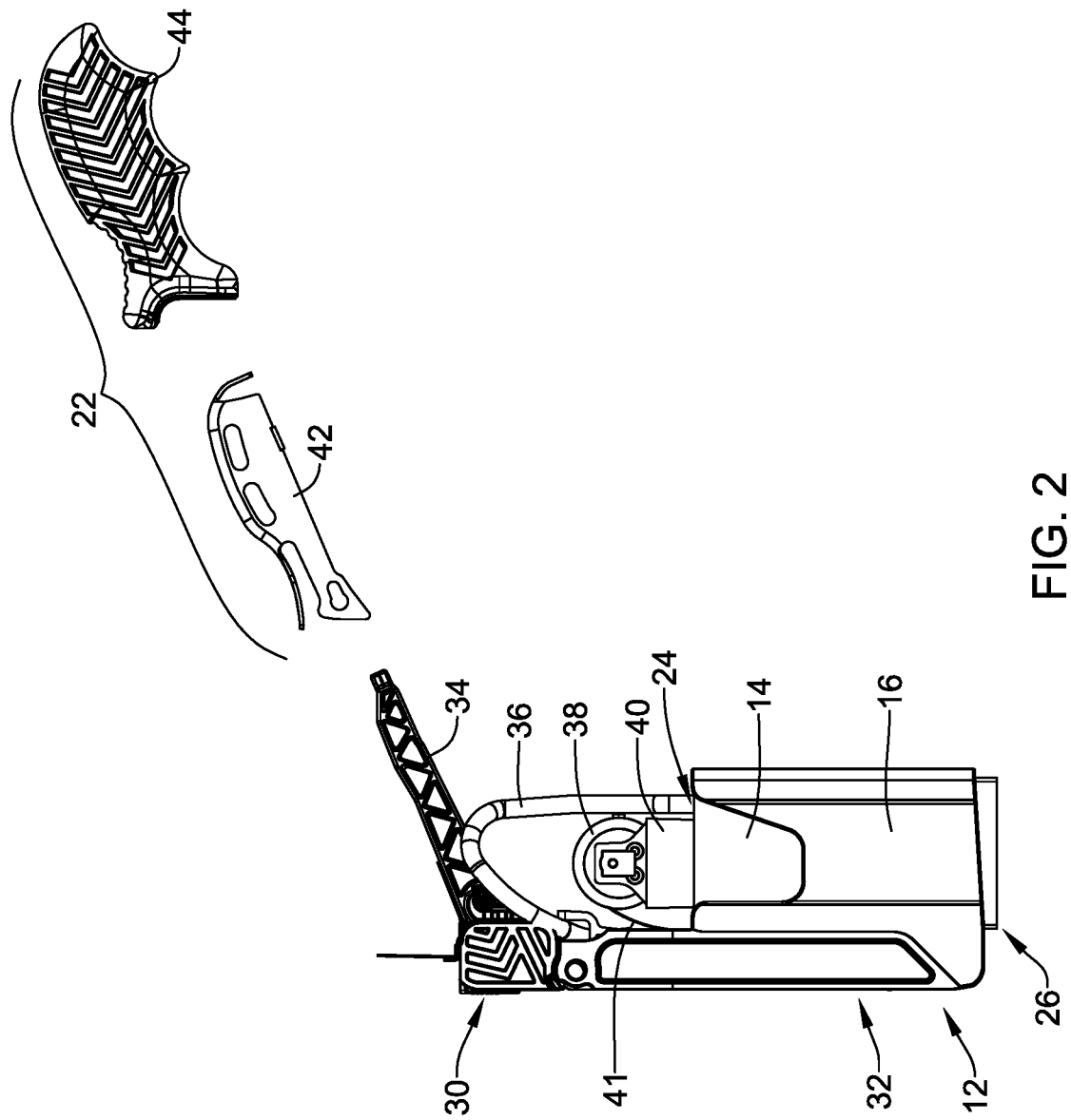
FIG. 2 is an exploded view of portions of the exemplary brush holder assembly of FIG. 1.

FIG. 2 illustrates a side view of the brush holder assembly 12 including the brush 14 positioned with the brush holder 16 as described above. FIG. 2 further illustrates that the brush 14 may include a first or upper end surface 24 and a second or lower end surface 26 and a length extending therebetween. The second end surface 26 may be in electrical contact with a conductive surface 18 (shown in FIG. 1) of a moving (e.g., rotating, sliding, etc.) component 20 (shown in FIG. 1) of an electrical machine (e.g., a collector ring, a slip ring, or a commutator) and conduct electrical current therefrom.

In some examples, the brush holder 16 may be secured to a mounting block (the mount block is not shown in FIG. 2) configured and adapted to be mounted to or otherwise engaged with another structure. The brush holder assembly 12 may be configured to place the brush 14 in contact with the conductive surface 18 (shown in FIG. 1), such as the surface of the rotating component 20 (shown in FIG. 1) of the electrical machine. The brush 14 may extend from the lower edge of the brush holder 16 such that the second end surface 26 of the brush 14 engages the conductive surface 18 (shown in FIG. 1).

As shown in FIG. 2, the brush holder assembly 12 may include an upper beam 30 and a lower beam 32 hingedly or pivotedly coupled to one another. When the upper beam 30 and the lower beam 32 are aligned with one another (e.g., the longitudinal axis of the upper beam 30 is parallel with the longitudinal axis of the lower beam 32), the brush holder 16 may be considered to be in an engaged, or locked, position such that the brush 14 may be contiguous with or in contact with the conductive surface 18 (shown in FIG. 1). As will be described in greater detail below, when the upper beam 20 is tilted from the lower beam 32 (e.g., the longitudinal axis of the upper beam 30 is oblique to the longitudinal axis of the lower beam 32), the brush holder 16 may be considered to be in a disengaged, or unlocked, position such that the brush 14 may be non-contiguous with, spaced from, or otherwise not in direct electrical contact with the conductive surface 18 (shown in FIG. 1).

FIG. 2 further illustrates that the brush holder assembly 12 may include a wear state monitor 38 and a spacer 40. Additional aspects of the wear state monitor 38 and associated structure and functionality are described in U.S. Patent Publication Nos. 2020/0112133 and 2020/0112223, the disclosures of which are incorporated by reference herein. The spacer 40 may be attached to the first end surface 24 of the brush 14. Additionally, FIG. 2 illustrates that the wear state monitor 38 may be coupled to a spring 41. In some examples, a portion of the spring 41 may be coiled around a portion of the wear state monitor 38, with an elongate portion of the spring 41 extending from the coiled portion. Thus, the wear state monitor 38 may be positioned within the coiled portion of the spring 41.

As described above, in some examples the wear state monitor 38 may be mounted adjacent a surface of the spring 41 or otherwise within the spring 41, such as within the coiled portion of the spring 41. The spring 41 may include a constant force spring, which provides tension to the brush 14, the wear state monitor 38 or both the brush 14 and the wear state monitor 38 to bias the brush 14 toward and in contact with the conductive surface 18 (not shown in FIG. 2) of the rotating component 20 (not shown in FIG. 2). In other words, the spring 29 may include a coiled portion designed to provide a force to engage the brush 14 with a rotating component 20 (not shown in FIG. 2) of an electrical machine, such as a slip ring, a commutator, and the like.

Additionally, the spring 41 may be attached to a portion of the brush holder 16 and/or the lower beam 32 of the brush holder assembly 12. In some instances, a first end of the spring 41 may be removably coupled to the brush holder 16 and/or the lower beam 32 with an elongate portion of the spring 41 extending along a side surface of the brush 14, between the brush 14 and the lower beam 32.

FIG. 2 further illustrates that the brush holder assembly 12 may include one or more conductive wires 36 extending from the first end surface 24 of the brush 14 to one or more components of the brush holder assembly 12 to conduct electricity from the brush 14. For example, the conductive wires 36 may extend from the first end surface 24 of the brush 14 and attach to the lower beam 32, the upper beam 30 or both the lower beam 32 and the upper beam 30.

In some examples, a remote site monitor (not shown in the Figures) may be configured to monitor at least a condition of one or more components of the brush holder assembly 12. To do so, the remote site monitor may be configured to identify each brush holder assembly 12 on a particular machine or at a particular site and/or store an installation date and any servicing dates for each brush holder assembly 12 and/or components thereof, such as the installation date of a brush 14 in the brush holder assembly 12. As will be described in greater detail below, the brush holder assembly of each system 10 may include an identification tag which corresponds to a particular position of the brush holder assembly 12 on the electrical machine (e.g., electrical generator). The system 10 may identify and monitor the status of the brush associated with each brush holder assembly 12 according to its unique identification tag. Further, in some examples, the wear state monitor 38 (or other sensor of the brush holder assembly 12) may output a signal to the site monitor indicating that a brush 14 or other component of the electrical machine has been removed and/or replaced, and/or an indication that a new brush 14 has been installed. Component replacement information may be collected and monitored by the wear state monitor 38, one or more sensors of the brush assembly 12 and/or the site monitor.

As discussed above, in some embodiments a handle assembly 22 may be attached to the brush holder assembly 12 to facilitate engagement and disengagement of the brush 14 from the conductive surface 18. For example, the handle assembly 22 may be attached to the upper beam 30 such that movement of the handle assembly 22 actuates (e.g., pivots, slides, releases) the upper beam 30 relative to the lower beam 32 to disengage the brush holder assembly 12 from a mounting block or other mounting fixture of the electrical machine. As will be discussed in greater detail below, in some examples, the handle assembly 22, or portions thereof, may be removable from the upper beam 30 or another portion of the brush holder assembly 12.

FIG. 2 illustrates an exploded view of the handle assembly 22, which may include a frame 42 and a grip 44. The frame 42 may be formed of a metallic material, such as stainless steel, and the grip 44 may be formed of a rubber or polymeric material. As will be described in greater detail below, when assembled, the grip 44 may substantially cover the entire frame 42. For example, in some embodiments, the grip 44 may substantially surround the frame 42 and provide an ergonomic shape designed to facilitate engagement and disengagement of the brush 14 from the conductive surface 18. It can be appreciated that the frame 42 may be designed to provide a rigid support for the grip 44. Accordingly, in some examples, the grip 44 may be over molded onto the frame 42. The grip 44, when formed of a rubber or polymeric material, may additionally provide an insulative barrier from the electrically conductive components of the brush holder assembly 12 when personnel grasps the grip 44.

As will be described in greater detail below, in some examples, one or more surfaces and/or engagement features of the frame 42 may be designed to engage a backbone 34 of the upper beam 30. The engagement features of the frame 42 may be designed to releasably engage from the backbone 34 of the upper beam 30. Allowing the frame 42 and grip 44 to be released from the backbone 34 may permit the handle assembly 22 to be removed and replaced if necessary. For example, in some instances the grip 44 may be worn away or deteriorate over time. Rather than replacing the entire brush holder assembly 12, it may be desirable to simply replace the handle assembly 22 (including the frame 42 and grip 44).

Figure 3:
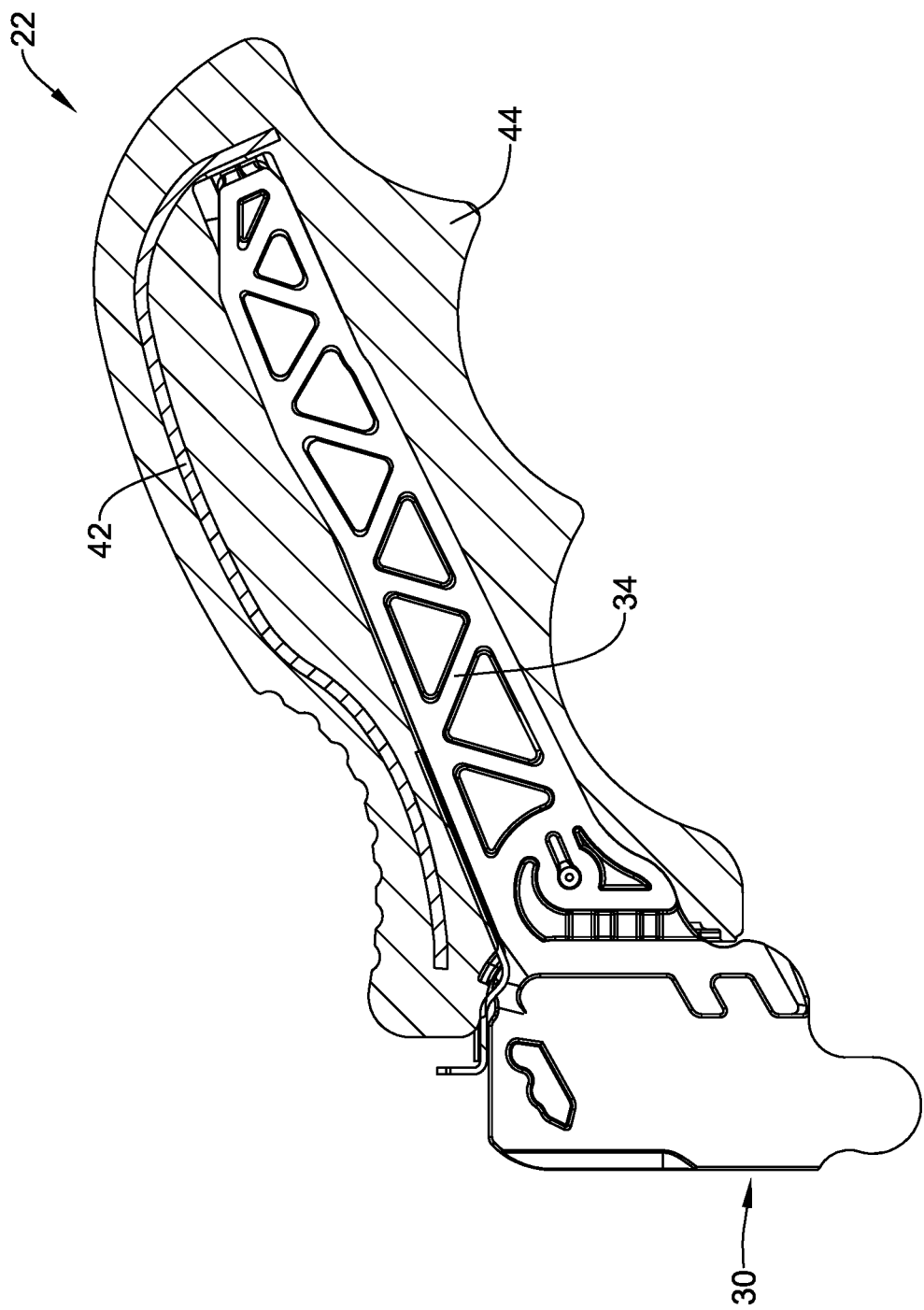
FIG. 3 is a cross-sectional view of a portion of the exemplary brush holder assembly of FIG. 1.

FIG. 3 is a cross-sectional view showing the handle assembly 22 (including the frame 42 and the grip 44) engaged with the backbone 34 of the upper beam 30. As described above, FIG. 3 illustrates that a portion of the frame 42 may be embedded within a portion of the grip 44. In other words, the grip 44 may be attached to one or more surfaces of the frame 42 while leaving a portion of other surfaces of the frame 42 free from the grip 44 material. For example, in some instances, the grip 44 may contact an outer surface of the frame 42 while leaving the inner surface of frame 42 free of grip 44 material. The portion of the frame 42 which is free of the grip 44 material may be designed to engage one or more features and/or surfaces of the backbone 34. In other portions of the handle assembly 22, a portion of the grip 44 material may be interposed between, in some cases compressed between, the frame 22 and the backbone 34 to provide an interference fit therebetween.

Figure 4:
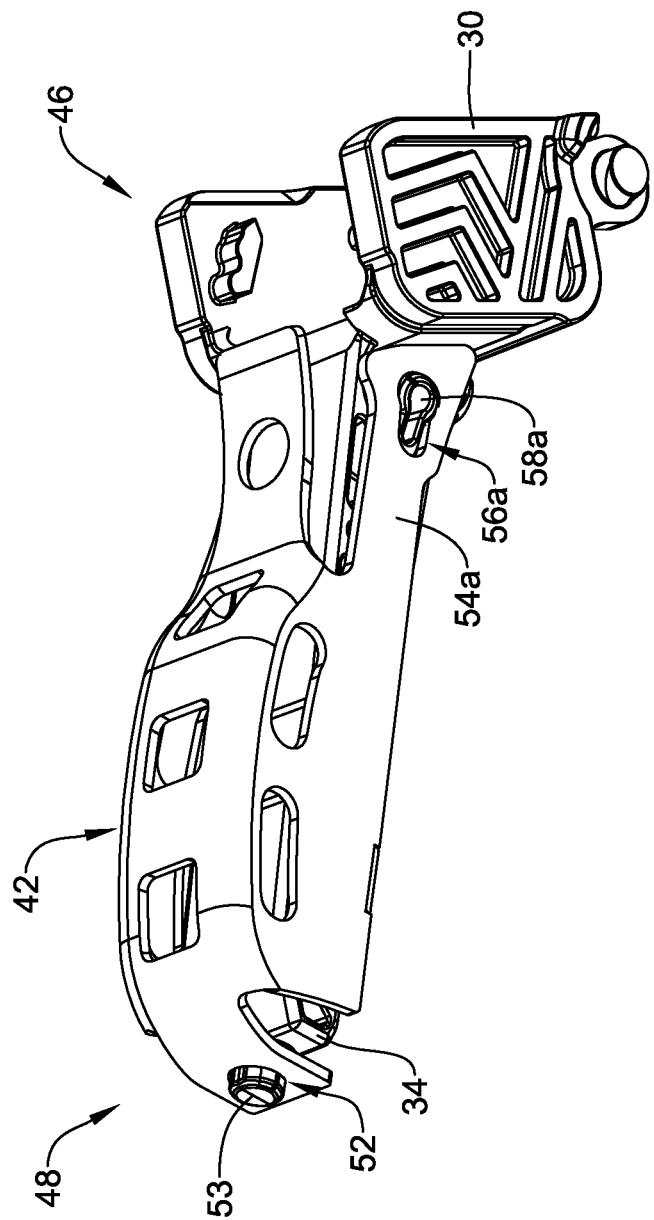
FIG. 4 is a perspective view of a portion of the exemplary brush holder assembly of FIG. 1.

FIG. 4 illustrates the frame 42 engaged with the backbone 34 of the upper beam 30. As shown in FIG. 4, both the frame 42 and the backbone 34 may include various features which mate and/or engage with one another and facilitate the engagement of the frame 42 with the backbone 34. It can be appreciated that, for simplicity, the grip 44 has been omitted from FIG. 4, thereby permitting visualization of the engagement of the frame 42 with the backbone 34.

FIG. 4 illustrates that the backbone 34 may include a first end region 46 and a second end region 48. The second end region 48 of the backbone 34 may include a projection 50 which extends away from the backbone 34. In some instances, the projection 50 may be substantially aligned with the longitudinal axis of the backbone 34. Additionally, FIG. 4 illustrates that the projection 50 may include a circular cross-sectional shape. However, other shapes are contemplated for the cross-section of the projection 50. For example, the projection 50 may include a triangular, square, ovular, rectangular, geometric, dome, polygonal or any other suitable shape.

FIG. 4 further illustrates that to engage the backbone 34 with the frame 42, the projection 50 may extend through an aperture 52 located in an end region 48 of the frame 42. FIG. 4 shows that the shape of the aperture 52 may generally be the same shape as the projection 50. In other words, for the example shown in FIG. 4, the aperture 52 may assume a circular shape which mirrors the circular cross-sectional shape of the projection 50. It can be further appreciated that just as the projection 50 may assume different cross-sectional shapes (discussed above), the aperture 52 may assume different cross-sectional shapes which are designed to mate with any particular cross-sectional shape defined by the projection 50.

The engagement of the distal projection 50 and the aperture 52 may be one of several points of contact between the frame 42 and the backbone 34. It can be appreciated that having several points of contact/engagement between the frame 42 and the backbone 34 may result in increased securement between the frame 42 and the backbone 34 when the handle assembly 22 is positioned on the backbone 34.

In addition to the engagement of the end projection 50 and the backbone 34 via the aperture 52, FIG. 4 illustrates another point of engagement between the frame 42 and the backbone 34. For example, FIG. 4 illustrates that the frame 42 may be include a first tab 54a. The first tab 54a may include a portion of the frame 42 which may be designed to flex laterally, away from the backbone 34 (flexing of the first tab 54a will be shown in further detail in FIGS. 7-9 below). As will be discussed in greater detail below, the first tab 54a may include an aperture 56a which is designed to engage a side projection 58a positioned on a side surface of the backbone 34 near an opposing end of the backbone 34.

Similar to the design and engagement of the end projection 50 and the aperture 52, the shape of the aperture 56a may be designed to mirror the shape of the side projection 58a. Therefore, it can be appreciated that as the handle assembly 22 (including both the frame 42 and the grip 44) is positioned onto the backbone 34, the first tab 54a may flex laterally outward and slide up and over the side projection 58a, thereby allowing the side projection 58a to align with the aperture 56a and extend therethrough. In other words, as the handle assembly 22 is advanced onto the backbone 34, the first tab 54a may flex laterally outward away from the backbone 34 until the side projection 58a is aligned with the aperture 56a. After the side projection 58a is aligned with the aperture 56a, the first tab 54a may revert laterally inward (back toward the backbone 34), thereby securing the first tab 54a (and, consequently, the frame 42) to the side projection 58a. It is noted that while not shown in FIG. 4, the frame 42 may include a second tab 54b on an opposite side of the frame 42, including the same attachment features (e.g., an aperture 56b) which engage another side projection 58b located on the backbone 34 on the opposite side of the backbone 34, for example. The second tab 54b, aperture 56b and the proximal projection 58b may be identical to the first tab 54a, aperture 56a and the proximal projection 58a, just positioned on the opposite side of the backbone 34, for example.

Figure 5:
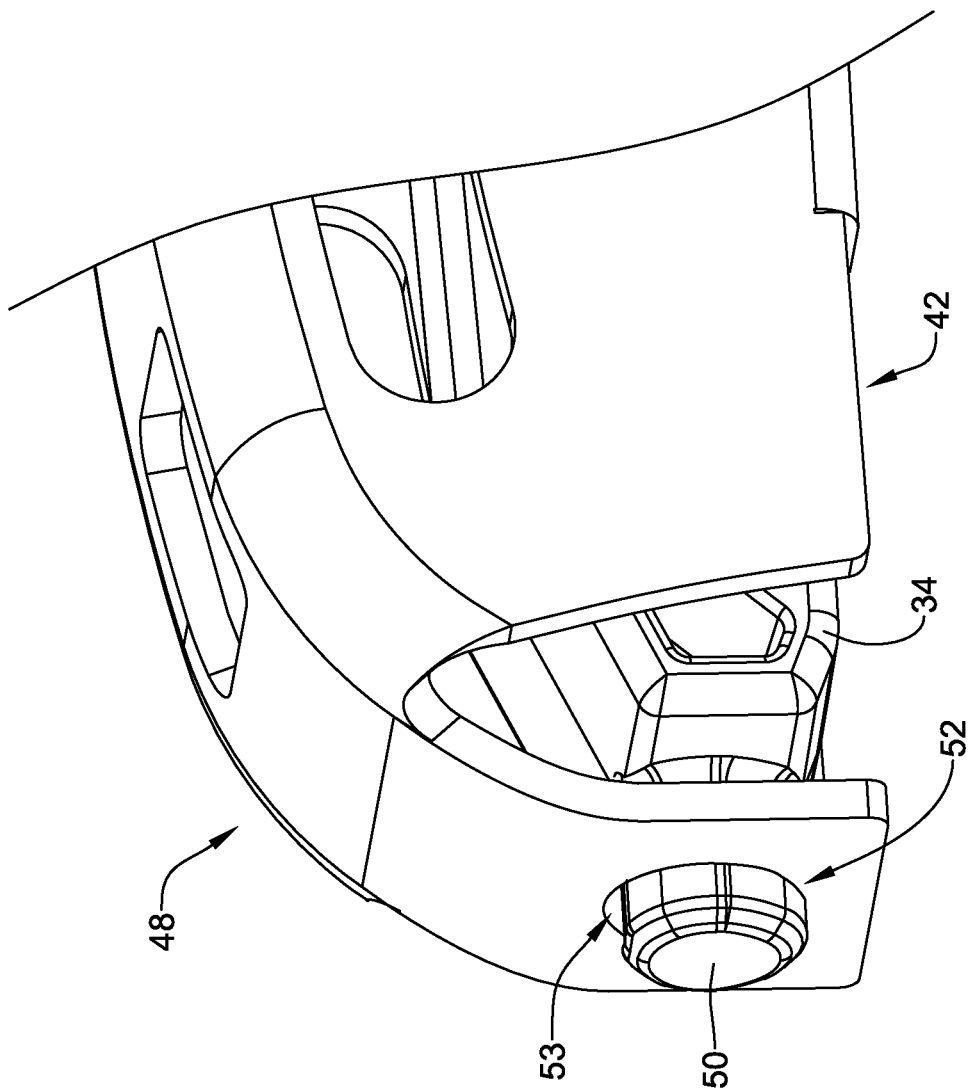
FIG. 5 is a detailed view of the portion of the exemplary brush holder assembly shown in FIG. 4.
Figure 5A:
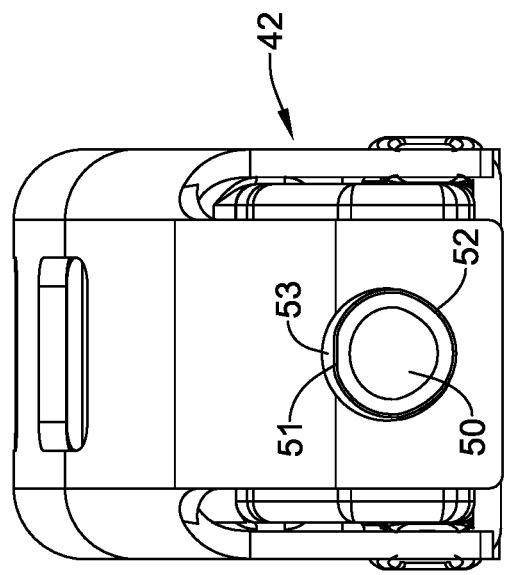
FIG. 5A is an end view of the portion of the exemplary brush holder assembly shown in FIG. 5.

FIG. 5 illustrates a detailed view of the second end region 48 of the frame 42. In particular, FIG. 5 illustrates the frame 42 engaged with the backbone 34 such that the projection 50 extends through the aperture 52. However, FIG. 5 further illustrates that, in some examples, the projection 50 and/or the aperture 52 may be designed such that a gap 53 may be present between a portion of the outer peripheral surface of the projection 50 (e.g., the circumferential surface of the projection 50) and a portion of the frame 42 defining the aperture 52. For example, as shown in the end view of FIG. 5A, the projection 50 may not be perfectly circular. Instead, peripheral surface of the projection 50 may include a flattened face (e.g., a flat face) 51, providing the gap 53 between the flattened face 53 along the peripheral surface of the projection 50 and the surface of the frame 42 defining the aperture 52. The flattened face 53 of the projection 50 may provide tolerance between the size of the projection 50 and the size of the aperture 52 to ensure the lower surface of the projection 50 contacts the surface of the aperture 52, to generate a securing force therebetween.

Alternatively, the aperture 52 may not be perfectly circular. Instead, the aperture 52 may include an enlarged portion providing the gap 53 between the circumferential surface of the projection 50 and the surface of the frame 42 defining the aperture 52. The enlarged portion of the aperture 52 may provide tolerance between the size of the projection 50 and the size of the aperture 52 to ensure the lower surface of the projection 50 contacts the surface of the aperture 52, to generate a securing force therebetween.

Figure 6:
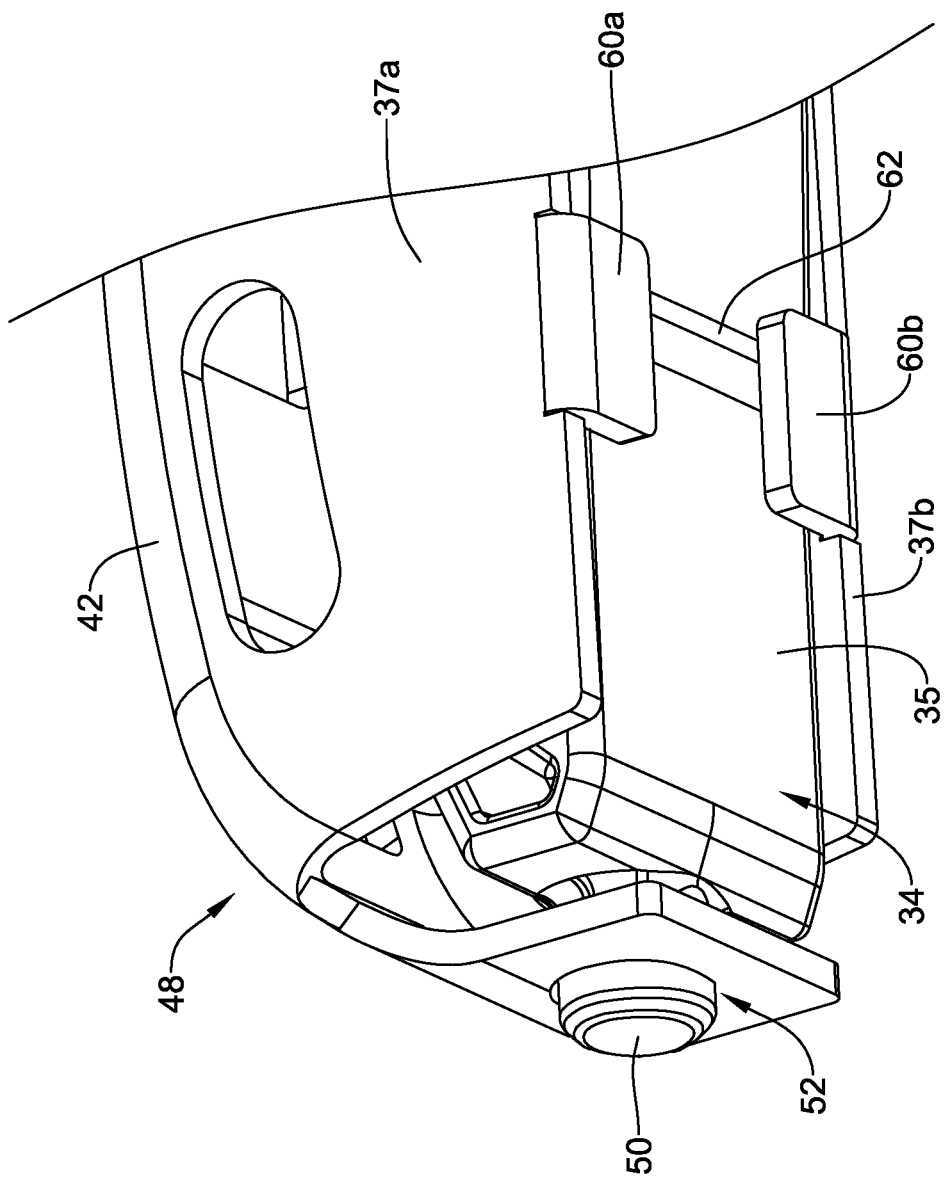
FIG. 6 is another detailed view of the portion of the exemplary brush holder shown in FIG. 4

FIG. 6 illustrates another detailed view of the second end region 48 of the frame 42. Specifically, FIG. 6 illustrates a bottom view of the frame 42 which is engaged with the backbone 34. Like FIG. 5, FIG. 6 illustrates the projection 50 extending through the aperture 52. Additionally, FIG. 6 illustrates that the frame 42 may include a first flange 60a and a second flange 60b extending inward along a bottom surface 35 of the backbone 34 from first and second sides 37a/37b of the frame 42. As illustrated in FIG. 6, the first flange 60a and the second flange 60b may engage a sloped shelf 62 located on the bottom surface 35 of the backbone 34. The sloped shelf 62 may also be described as a ramp or a ramped incline extending along a portion of the bottom surface 35 of the backbone 34.

It can be appreciated that to attach the handle assembly 22 (including the frame 42) to the backbone 42, the frame 42 may be advanced in a direction along the backbone 34 from the second end 48 toward the first end 46 of the backbone 34 whereby each of the first flange 60a and the second flange 60b may engage the sloped shelf 62. It can be appreciated that the sloped shelf 62 may be designed such that as the first flange 60a and the second flange 60b are advanced along the backbone 34, each of the first flange 60a and the second flange 60b may engage and exert a force against the sloped shelf 35 as the frame 42 is gradually advanced along the backbone 34.

It can be appreciated that the pressing of the first flange 60a and the second flange 60b against the sloped shelf 35, along with the engagement of the projection 50 and the aperture 52 and the engagement of the first and second tabs 54a/54b with the projections 58a/58b may provide a tight engagement of the handle assembly 22 with the backbone 34. It is noted that in some instances, the first flange 60a and the second flange 60b may directly contact the lower surface 35 and sloped shelf 62 of the backbone 34, however, in other instances the first flange 60a and the second flange 60b may indirectly contact the lower surface 35 and sloped shelf 62 of the backbone 34 with a layer of the material of the grip 44 interposed between the first and second flanges 60a, 60b and the surface 35 and/or sloped shelf 62 of the backbone 34. Thus, the material of the grip 44 may be molded around at least a portion of the first and second flanges 60a, 60b to provide an interference, compressive fit therebetween.

Figure 7:
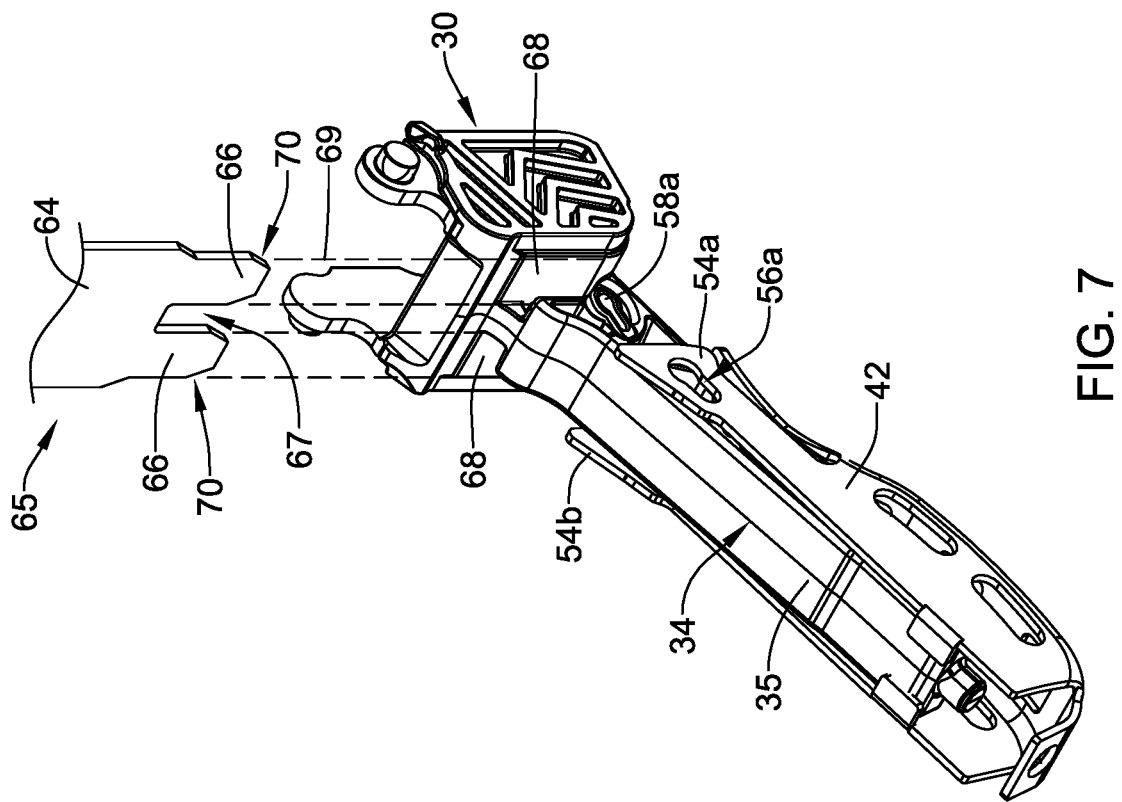
FIG. 7 illustrates a removal tool aligned with a portion of the exemplary brush holder assembly shown in FIG. 4.
Figure 8:
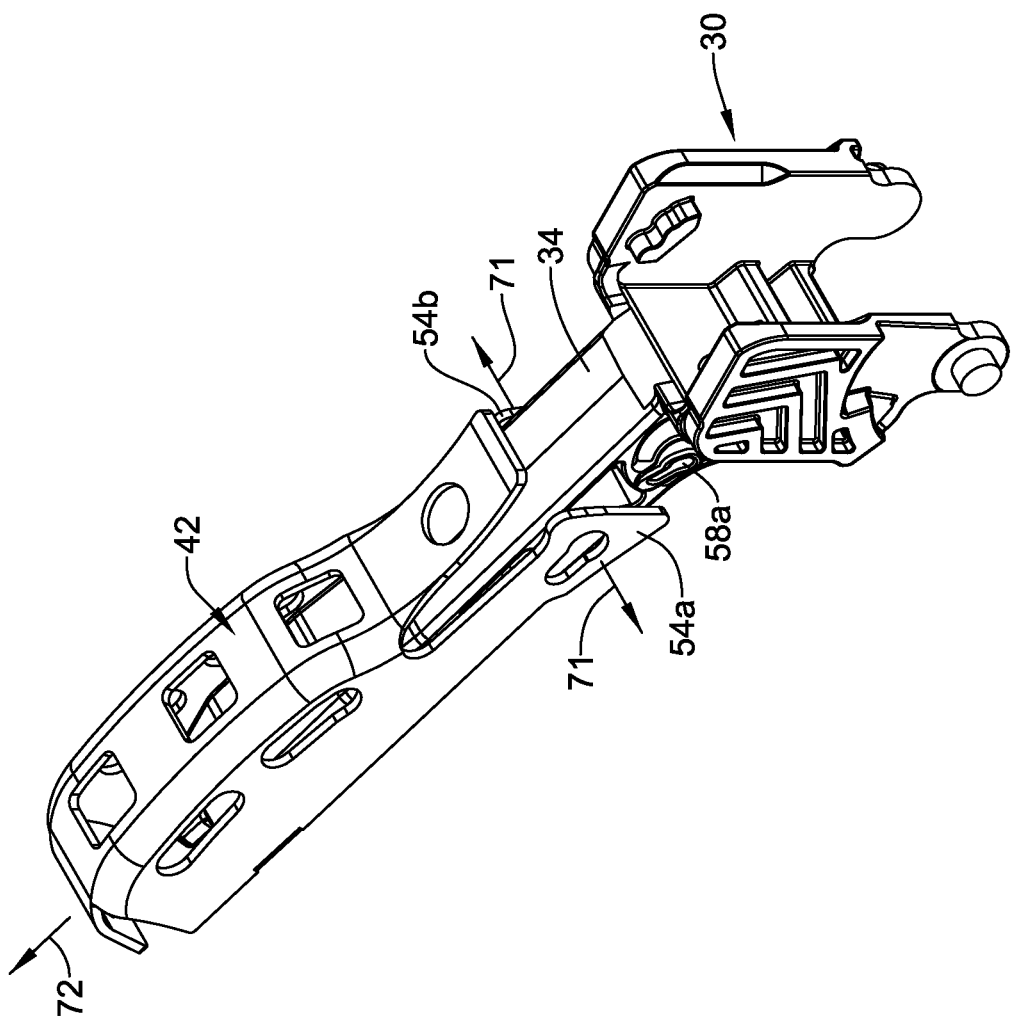
FIG. 8 illustrates the disengagement of two components of the exemplary brush holder assembly shown in FIG. 4.
Figure 9:
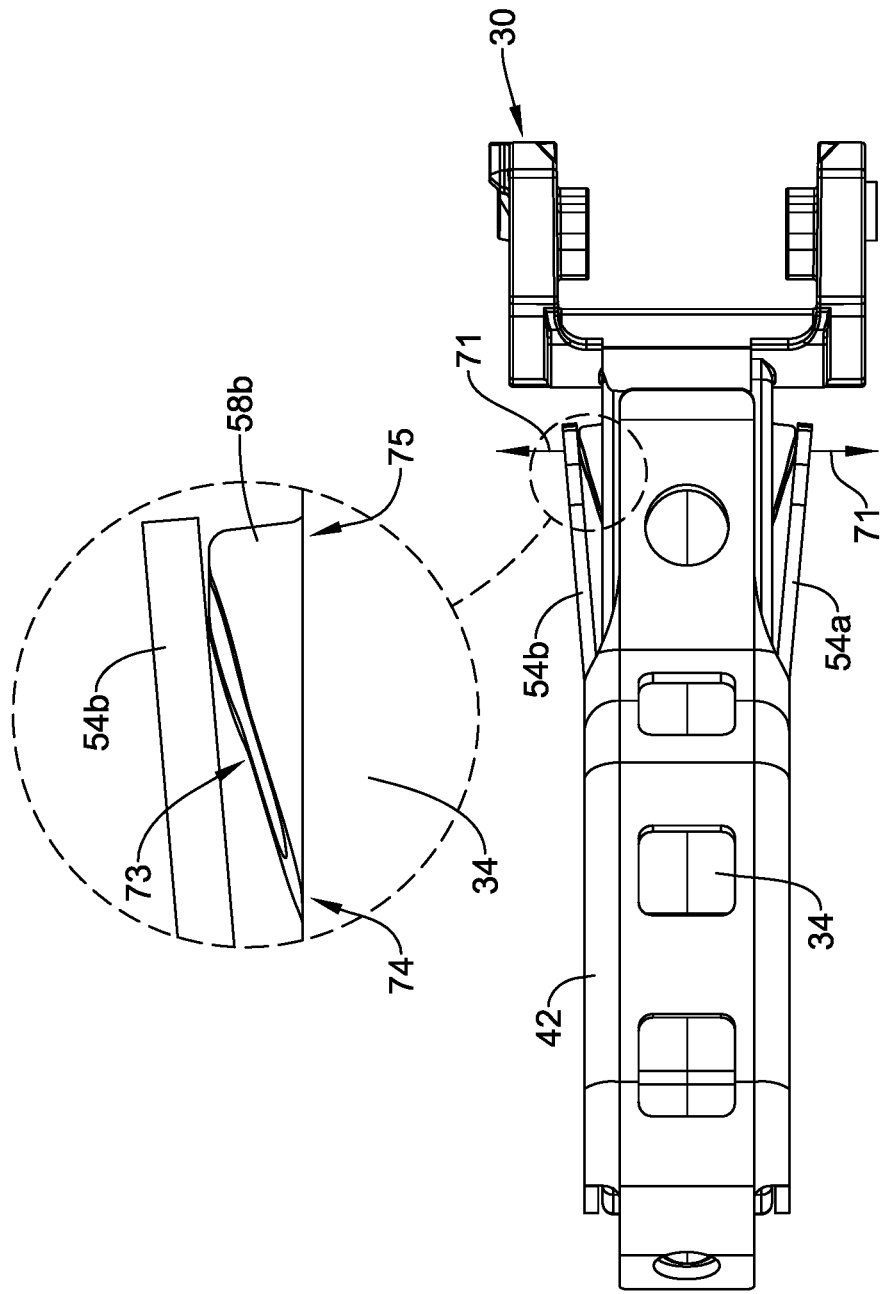
FIG. 9 illustrates a bottom view of two components of the exemplary brush holder assembly shown in FIG. 4.

FIGS. 7-9 illustrate a methodology for removing the handle assembly 22 (including the frame 42 and the grip 44) from the backbone 34. Like FIGS. 4-6, FIGS. 7-9 are shown without the grip 44 attached to the frame 42. However, it can be appreciated that the removal of the handle assembly 22 from the backbone 34 may be accomplished according to the following method with the grip 44 attached to the frame 42.

FIG. 7 illustrates a bottom view of the frame 42 and the upper beam 30 (including the bottom surface 35 of the backbone 34). As described above, FIG. 7 illustrates that the frame 42 includes a first tab 54a and a second tab 54b, each of which may be designed to flex laterally away from the backbone 34 on opposite sides of the backbone 34 to permit engagement and disengagement of the apertures 56a/56b (note that aperture 56b is obstructed from view in FIG. 7) with the projections 58a/58b (note that projection 58b is obstructed from view in FIG. 7).

Additionally, FIG. 7 illustrates that a handle assembly removal tool 64 may be employed to assist in the removal of the frame 42 from the backbone 34. Specifically, FIG. 7 illustrates that the handle assembly removal tool 64 may be utilized to flex both the first tab 54a and the second tab 54b laterally away from the backbone 34 in opposite directions, thereby disengaging the projections 58a/58b from the apertures 56a/56/b and providing clearance for the tabs 54a/54b to slide over the projections 58a/58b as the frame 42 is pulled away from the backbone 34.

FIG. 7 illustrates that the distal end 65 of the handle assembly removal tool 64 may include one or more prongs 66 separated by a slot 67. The slot 67 may be designed to mate with a portion of the upper beam 30 such that the one or more prongs 66 may contact both tabs 56a/56b and a face 68 of the upper beam 30. The dashed lines 69 illustrated in FIG. 7 show the insertion path of the removal tool 64 as a user engages the removal tool 64 with the frame 42 and the backbone 34 of the upper beam 30. The prongs 66 of the removal tool 64 may be positioned between the face 68 of the upper beam 30 and the backbone 34 extending therefrom while deflecting the first and second tabs 54a/54b in opposite lateral directions away from the backbone 34. After flexing the tabs 56a/56b laterally away from the backbone 34 such that the tabs 56a/56b are clear of the projections 58a/58b, the user may grasp the handle assembly 22 and pull the handle assembly 22, including the frame 42, away from the face 68 of the upper beam 30 to disengage the handle assembly 22 from the backbone 34.

FIG. 7 further illustrates that the leading edge of each of the prongs 66 (e.g., the profile of the leading edge of each of the prongs 66) may include an angled face or surface 70 which, when brought into contact with each of the first tab 54a and the second tab 54b, are designed to incrementally flex or deflect the tabs 54a/54b laterally outward as the removal tool 64 is gradually advanced toward the upper beam 30 (e.g., advanced along the face 68).

FIG. 8 illustrates a perspective view of the frame 42 being removed from the backbone 34 of the upper beam 30. For simplicity, the handle assembly removal tool 64 is omitted from FIG. 8. However, as described above, the arrows 71 in FIG. 8 illustrate that each of the first tab 54a and the second tab 54b may flex laterally away from the side surfaces of the backbone 34 in opposite directions, thereby providing clearance for each of the tabs 54a/54b to clear the projections 58a/58b (note the projection 58b is obstructed from view in FIG. 8), respectively, as the frame 42 is withdrawn from the backbone 34 (as shown by the arrow 72).

FIG. 8 also illustrates that each of the projections 58a/58b may be designed such that they include a slope (e.g., ramp) which increases laterally outward from a first, distal end of the projection to a second, proximal end of the projection. In other words, it can be appreciated that when the handle assembly 22 is inserted onto the backbone 34, the first tab 54a and the second tab 54b may ride along the sloped portion of the projection 58a/58b, thereby gradually flexing laterally outward as the frame 42 is advanced proximally. After riding along each sloped portion of each projection 58a/58b until the apertures 56a/56b reach the projections 58a/58b, each of the tabs 54a/54b may then revert inward whereby each of projections 58a/58b extend within the apertures 56a/56b, as described above (it is noted that the tab 54b, the aperture 56a and the projection 58b is obscured from view in FIG. 8). It can be appreciated that this configuration may permit the handle assembly 22 to be easily slid onto the backbone 34, but may also prevent the frame 42 from being removed from the backbone 34 without the aid of the handle assembly removal tool 64.

FIG. 9 illustrates a top view of the frame 42 being removed from the backbone 34 of the upper beam 30. As described above, the arrows 71 of FIG. 9 illustrates each of the first tab 54a and the second tab 54b flexing laterally outward, away from the backbone 34. Further, the detailed view of FIG. 9 shows the ramped portion 73 of the projection 58b, as described above. The detailed view of FIG. 9 shows the ramped portion 73 includes a first, proximal end 75 and a second, distal end 74, whereby the projection 58b ramps laterally away from the backbone 34 from the distal end 74 to the proximal end 75. As described above, when being removed, the handle assembly removal tool 64 may be utilized to flex the first tab 54a and the second tab 54b laterally outward to clear the lateral extent of the ramped portion 73 of the projection 58b.

Figure 10:
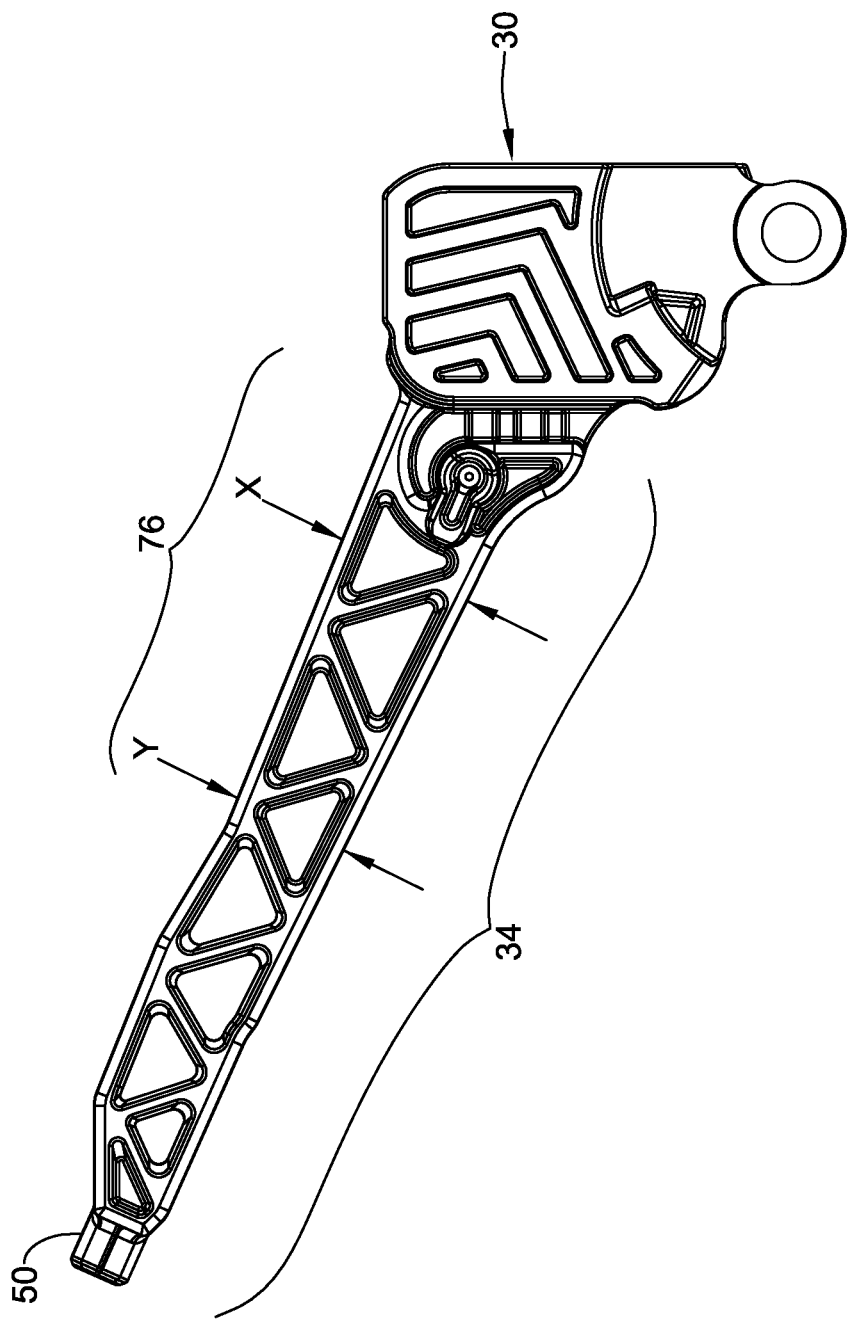
FIG. 10 illustrates an example upper beam with a backbone for the handle of the exemplary brush holder assembly of FIG. 1.

FIG. 10 illustrates a side view of the backbone 34 of the upper beam 30. In some examples, the backbone 34 may include one or more tapered regions. For example, FIG. 10 illustrates a tapered region 76 of the backbone 34. The tapered region 76 may include a first thickness Y (measured from the upper surface to the opposite lower surface) positioned distally of a second thickness X (also measured from the upper surface to the opposite lower surface). The thickness X, which may be nearer to the base of the handle may be greater than the thickness Y (which may be nearer to the tip of the handle). It can be appreciated that this tapered design configuration of the backbone 34 may improve the securement of the frame 42 as it is advanced proximally along the backbone 34 toward the base of the backbone 34. For example, as the handle assembly 22 is inserted over the backbone 34, the frame 42 may experience an increased clamping force against the backbone 34 as it is advanced from a thinner to a thicker portion of the backbone 34.

Figure 11:
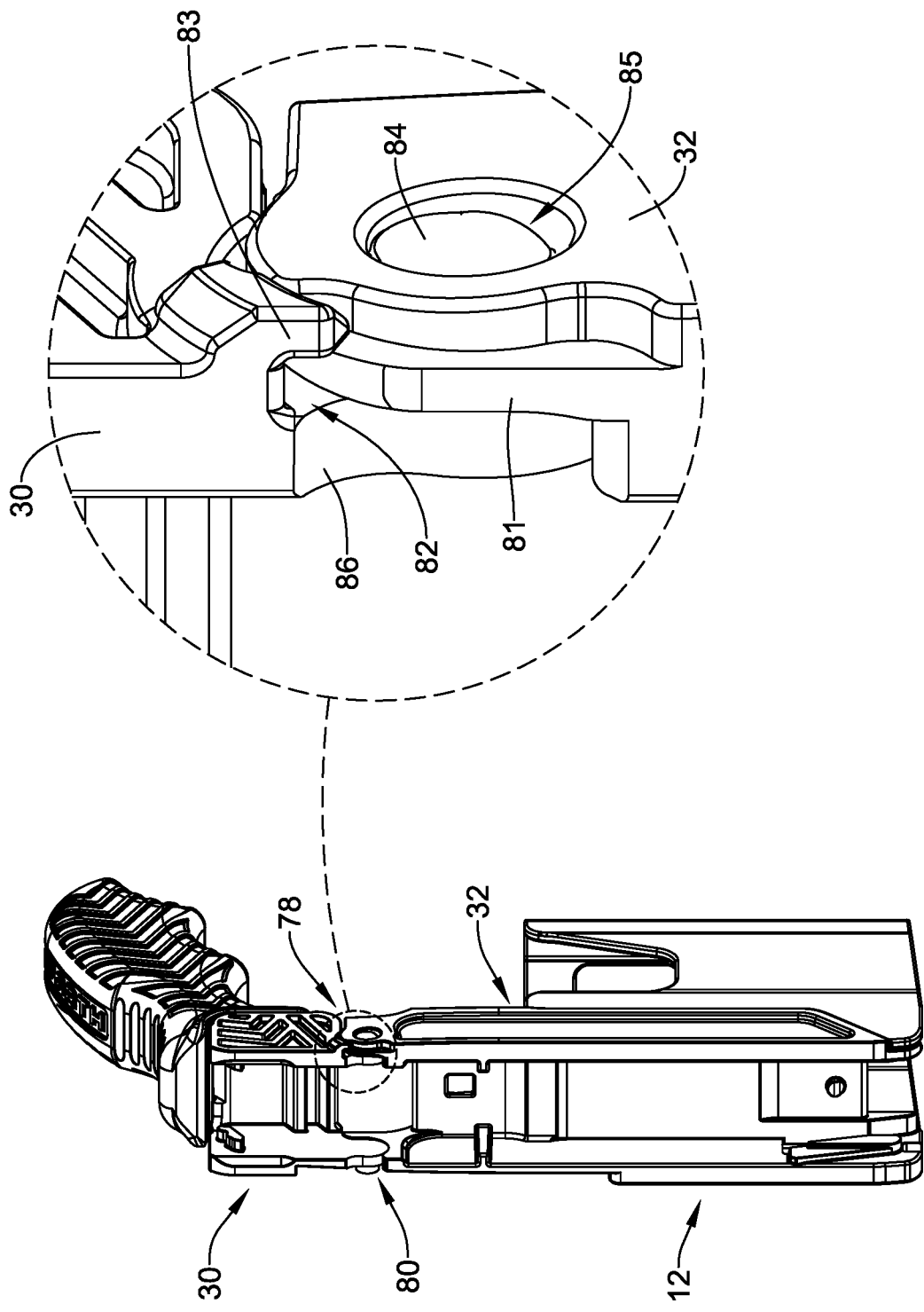
FIG. 11 illustrates the engagement of the upper beam and the lower beam of the exemplary brush holder assembly of FIG. 1.

As discussed above, engaging and disengaging the brush 14 from a rotating surface 18 of an electrical machine may include rotating or pivoting the upper beam 30 relative to the lower beam 32. It can be appreciated that when rotating the upper beam 30 relative to the lower beam 32, it may be desirable to maintain the alignment of the upper beam 30 with the lower beam 32. The detailed view of FIG. 11 illustrates several components which are designed to allow the upper beam 30 to rotate with respect to the lower beam 32. Further, the components shown in the detailed view are also designed to maintain the alignment of the upper beam 30 with the lower beam 32 as the upper beam is rotated with respect to the lower beam 32. It is noted FIGS. 12-13 provide a side view illustration of the upper beam 30 being rotated with respect to the lower beam 32.

FIG. 11 illustrates that the upper beam 30 and the lower beam 32 may be detachably coupled to one another via a first pin connection 78 and a second pin connection 80. The detailed view of FIG. 11 illustrates several components of the first pin connection 78. For example, the first pin connection 78 shown in the detailed view of FIG. 11 may include an end region of the upper beam 30 pinned to an end region of the lower beam 32. Specifically, the end region of the upper beam 30 may include a pin 84 which is designed to extend through an aperture 85 located along an end region of the lower beam 32. It can be appreciated that the pin 84 may permit the upper beam 30 to pivot about the central axis of the pin 84, which, consequently, permits the upper beam 30 to rotate with respect to the lower beam 32.

Additionally, FIG. 11 illustrates that the upper beam 30 may include a flange 83 extending away from a sidewall 86 of the upper beam 30. It can be appreciated from FIG. 11 that, together, the flange 83 and the sidewall 86 may form a channel 82. Additionally, the channel 82 may be designed to accept a rail 81 located along the end region of the lower beam 32. As shown in FIG. 11, the channel 82 may include a curve which generally matches the curve of the rail 81 located on the lower beam 32. It can be appreciated that the radius of curvature of both the channel 82 and the curved rail 81 may match the radius of curvature of the pin 84. It can further be appreciated that the engagement of the rail 81 within the channel 82 may limit the ability of the upper beam 30 to shift laterally with respect to the lower beam 32 in both lateral directions. In other words, the engagement of the rail 81 within the channel 82 may prevent the pin 84 from disengaging from the aperture 85 when the upper beam 30 is rotating with respect to the lower beam 32. As discussed above, the engagement of the rail 81 with the channel 82 may maintain the vertical alignment of the lower beam 32 with the upper beam 30 while the upper beam 30 is rotating with respect to the lower beam 32.

Figure 12:
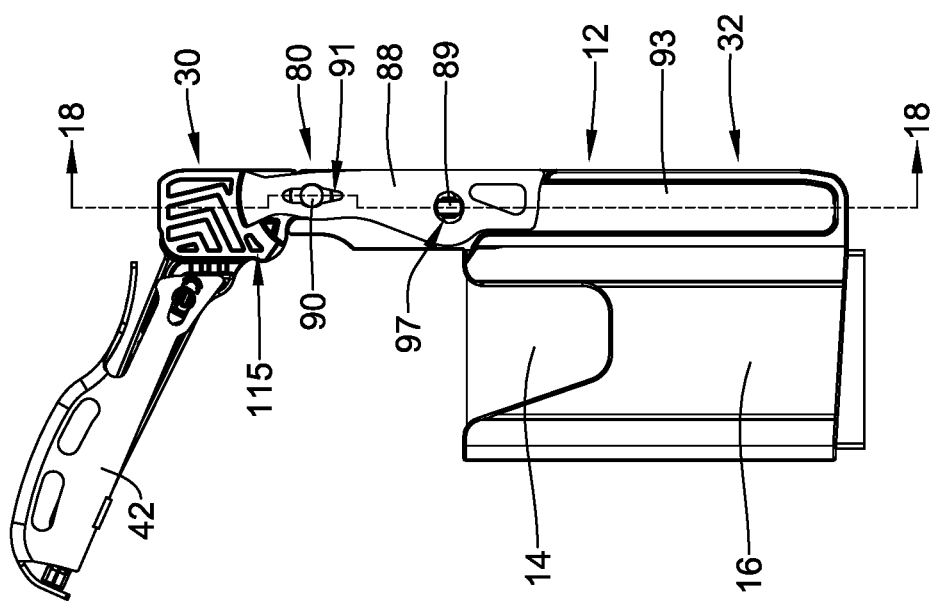

FIG. 12 illustrates a side view of the brush assembly holder 12 including the frame 42 attached to the upper beam 30 and the brush 14 positioned within the bush holder 16. It can be appreciated that the side view shown in FIG. 12 is the side of the brush assembly 12 which is opposite the pin connection 78 (described above and shown in FIG. 11).

FIG. 12 further illustrates the second pin connection 80 which, along with the first pin connection 78 (described above), may couple the upper beam 30 with the lower beam 32. The second pin connection 80 may include a catch arm 88 which is detachably couplable to both the upper beam 30 and the lower beam 32, a portion of which may overlap with a portion of the upper beam 30 and a portion of which may overlap with a portion of the lower beam 32. For example, the catch arm 88 may include an aperture 91 which is designed to accept a pin 90 located on the upper beam 30. The catch arm 88 may also include another aperture 97 which is designed to engage a pin 89 located on the lower beam 32. It can be appreciated that the engagement of the pin 90 with the aperture 91 and the engagement of the pin 89 with the aperture 97 may (along with the first pin connection 78 described above) couple the upper beam 30 to the lower beam 32, yet permit decoupling the upper beam 30 from the low beam 32, as further described below.

FIG. 13 illustrates the rotation of the upper beam 30 with respect to lower beam 32 as described above. For example, the arrow 92 shown in FIG. 13 depicts the pivotal rotation of the upper beam 32 (including the frame 42) relative to the lower beam 32. It can be appreciated from FIG. 13 that the upper beam 30 may pivotally rotate about the pin 90. Referring back to FIG. 11 above, it can be appreciated that the pin 84 and the pin 90 may share the same central rotational axis, and therefore, the upper beam 30 may simultaneously rotate about the central rotational axis of the pin 84 (obstructed in FIG. 13, but shown in FIG. 11) and central rotational axis of the pin 90 as it moves relative to the lower beam 32.

FIG. 14 illustrates an exploded view of the brush assembly holder 12 (including the brush 14 positioned within the brush holder 16). As described above, it can be appreciated that, during its lifecycle, it may be desirable to replace various components of the system 10. In order to replace various components of the system 10, it is necessary to dissemble and reassemble components of the system 10.

FIG. 14 generally shows various components of the brush holder assembly 12 which may be configured to separate from one another during the disassembly of the brush holder assembly 12. For example, as will be described in greater detail below, the catch arm 88 may be removed by pulling the catch arm away from the pin 90 of the upper beam 30. In other words, the pin 90 may be engaged with the aperture 91, but may be removed by applying a removal force to pull or flex the catch arm 88 away from the pin 90 such that the catch arm 88 is positioned laterally away from the pin 90 to allow the catch arm 88 to rotate about the pin 89 without being impeded by the pin 90. It is noted that the catch arm 88 may be flexed away from the pin 90 to allow the catch arm 88 to rotate about the pin 89 while the catch arm 88 remains engaged with the pin 89. Additionally, as will be described in greater detail below, further rotation of the catch arm 88 may permit its removal from the lower beam 32 (via a tapered bayonet-type connection of the pin 89 and the aperture 97).

After removal of the catch arm 88 from the upper beam 30 and the lower beam 32, the pin connection 78 may be easily manipulated to remove the pin 84 from the aperture 85 (both shown in FIG. 11), thereby freeing the upper beam 30 (including the handle assembly 22 shown in FIG. 2) from the lower beam 23. As shown in FIG. 14A, the pin connection 78 may be configured differently from the pin connection 80. Namely, the pin connection 78 may include a through aperture 85 for receiving the pin 84 of the upper beam 30 therein, whereas the pin connection 80 may be devoid of a through aperture. Instead, the pin connection 80 may include a saddle 61 against which a surface of the upper beam 30 is juxtaposed with while the pin 90 is engaged in the aperture 91 of the catch arm 88. The saddle 61 may include a concave curved surface having a center of curvature at the central rotational axis of the pin 84 and the pin 90, allowing a convex surface of the upper beam 30 to slide along the concave surface of the saddle 61 as the upper beam 30 is pivoted relative to the lower beam 32. Once the pin 90 is disengaged with the aperture 91, the upper beam 30 may be removed from the saddle 61 in a direction transverse to the rotational axis, permitting manipulation of the upper beam 30 to remove the pin 84 from the aperture 85 of the other pin connection 78.

It should be further noted that because the brush holder assembly 12 is disassembled in FIG. 14, the first pin connection 78 is visible in the illustration. As described above, the first pin connection 78 may be aligned with the second pin connection 80 (e.g., the pin 90 and the pin 84 may share a common central rotational axis).

Additionally, FIG. 14 illustrates that the brush holder assembly 12 may further include a cover plate 93. The cover plate 93 may be held in place via engagement with the lower beam 32. For example, the lower end of the cover plate 93 may include a tab 23 insertable into a slot 25 along a side of the lower beam 32 when the cover plate 93 is juxtaposed along the side of the lower beam 32. Further, the cover plate 93 may be further held in place via the opposite upper end of the cover plate 93 being sandwiched between the side surface of the lower beam 32 and the back surface of the catch arm 88 facing the lower beam 32. Further yet, in some examples, the upper end of the cover plate 93 may include a bowed or curve shape designed to curve away from the lower beam 32 (and therefore, toward the back side of the catch arm 88), thereby engaging and holding the cover plate 93 in tension against the back surface of the catch arm 88 (this may be in addition to the tab 23 being inserted into the slot 25, as described above). It can be appreciated that the tension imposed by the bow or curvature of the cover plate 93 may prevent the cover plate 93 from rattling and/or coming disengaged from the brush holder assembly 12.

Figure 15:
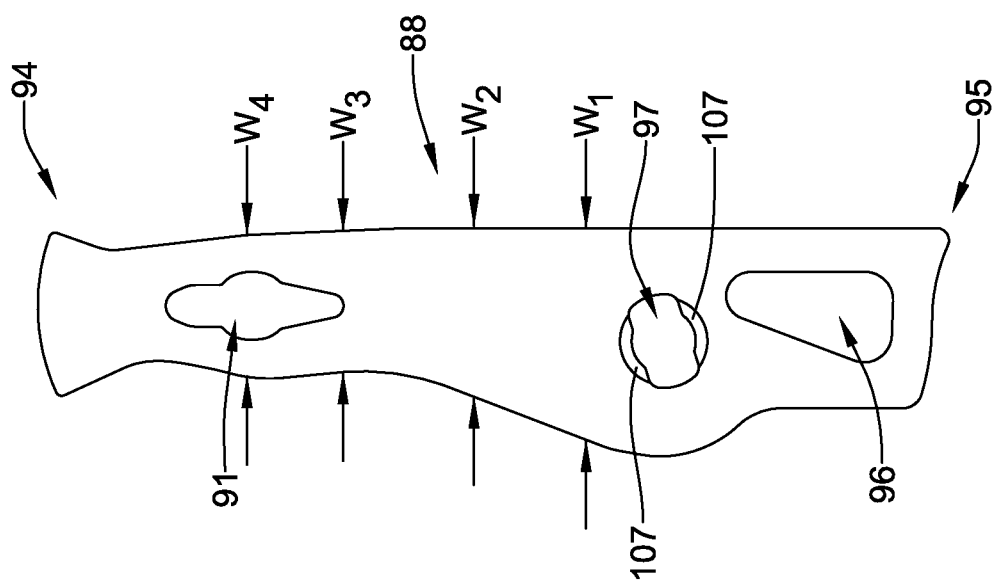
FIG. 15 is a front view of a catch arm of the exemplary brush holder assembly of FIG. 1.
Figure 16:
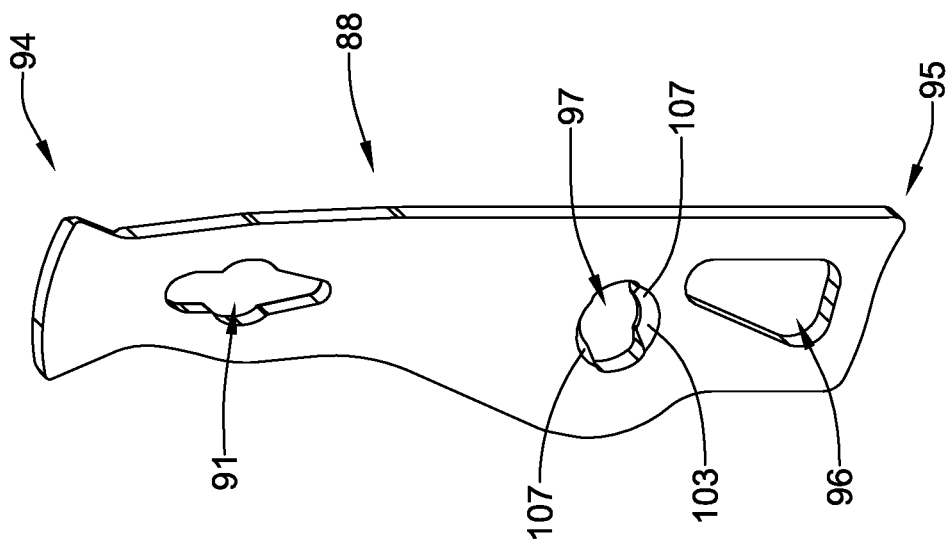
FIG. 16 is a perspective view of the catch arm shown in FIG. 15.

FIGS. 15 and 16 illustrate the catch arm 88. The catch arm 88, which may be a generally elongate plate in some instances, may include a first end 94 and a second end 95 opposite the first end 94. The distance between the first end 94 and the second end 95, which is the longest dimension of the catch arm 88, may be considered the length of the catch arm 88. As disclosed above, the first end 94 may be the end of the catch arm 88 which is positioned adjacent to the upper beam 30 while the second end 95 of the catch arm may be positioned adjacent to the lower beam 32.

Further, as described above, the catch arm 88 may include an aperture 91 which is designed to engage the pin 90 of the upper beam 30 and another aperture 97 designed to engage the pin 89 of the lower beam 32. Additionally, as described above, the catch arm 88 may further include an additional aperture 96 which (in addition to allowing the catch arm 88 to flex to a greater degree) may be utilized in the removal of the catch arm 88 from the brush holder assembly 12. Specifically, a catch arm removal tool (not shown in the Figures) may engage the aperture 91 and the aperture 96, whereby manipulation (e.g., rotation) of the catch arm removal tool rotates and disengages the catch arm 88 from the pin 89 of the lower beam 32. A more detailed description of the disengagement of the pin 89 of the lower beam 32 and the aperture 97 of the catch arm 88 is provided below with respect to FIG. 18).

FIG. 15 further illustrates that the width of the catch arm 88, measured perpendicular to the length of the catch arm 88 across the catch arm 88, may vary along the length of the catch arm 88. In some instances, the width of the catch arm 88 adjacent to the second end 95 may be greater than the width of the catch arm 88 adjacent to the first end 94. For example, FIG. 15 shows the catch arm 88 having a first width $W_1$ at a position closer to the second end 95 and a second width $W_2$ at a position closer to the first end 94 which is less than the width $W_1$. Furthermore, the catch arm 88 may have a third width $W_3$ at a position closer to the first end 94 than the second width $W_2$ which is less than both the width $W_2$ and the width $W_1$. In some examples, the thickness of the catch arm 88 may be substantially uniform along the length of the catch arm 88. Accordingly, the cross-sectional area of the catch arm 88 taken at width $W_3$ may be less than the cross-sectional area of the catch arm 88 taken at width $W_2$, and the cross-sectional area of the catch arm 88 taken at width $W_2$ may be less than the cross-sectional area of the catch arm 88 taken at width $W_1$. It is further noted that the cross-sectional area taken at width $W_4$ across the aperture 91 may be less than the cross-sectional area taken at width $W_3$, located closer toward the second end 95 than the cross-sectional area taken at width $W_3$. Thus, the cross-sectional area of the catch arm 88 may also generally decrease from the second end 95 toward the first end 94.

FIG. 15 further illustrates the aperture 96, which, as described above, may be utilized in the removal of the catch arm 88 from the brush holder assembly 12. Additionally, it can be appreciated that the aperture 96 may serve an additional function as removing the material from the catch arm 88 (to create the aperture 96) may permit the second end 95 of the catch arm 88 to flex to a greater degree than it would without the presence of the aperture 96. Therefore, it can be appreciated that reducing the width, and thus the cross-sectional area, of the catch arm 88 (along any given portion thereof) and including one or more apertures (e.g., aperture 96), may allow the catch arm 88 to flex evenly along its entire length. It can be further appreciated that designing the catch arm 88 to include variable widths and apertures, may allow the catch arm 88 to sufficiently flex such that it is prevented from permanently deforming when the upper beam 30 is pivoted relative to the lower beam 32, as described above. Further, increasing the flexibility in a portion of the catch arm 88 which is adjacent to the upper beam 30 may also aid in a user's ability to flex and thus separate the catch arm 88 from the upper beam 30 during disassembly of the brush holder assembly 12.

FIG. 16 illustrates a perspective view of the catch arm 88. Particularly, the aperture 97 may be configured to lockingly engage the pin 89 through relative rotation therebetween. For instance, the aperture 97 may be non-circular and the pin 89 may be shaped to complement the non-circular opening of the aperture 97 such that the pin 89 may be passed through the aperture 97 when the catch arm 88 is in a first rotational orientation, and then the pin 89 will not be able to be removed from the aperture 97 when the catch arm 88 is in a second rotational orientation different from the first rotational orientation. For instance, the catch arm 88 may include beveled flanges extending into the aperture on opposite sides of the aperture 97, creating a generally rectangular opening through the catch arm 88. The pin 89 may have a corresponding generally rectangular head that can pass through the aperture 97 in a first rotational orientation, then be rotated to engage the beveled flanges to prevent removal of the pin 89 from the aperture 97 in a second rotational orientation.

Figure 16A:
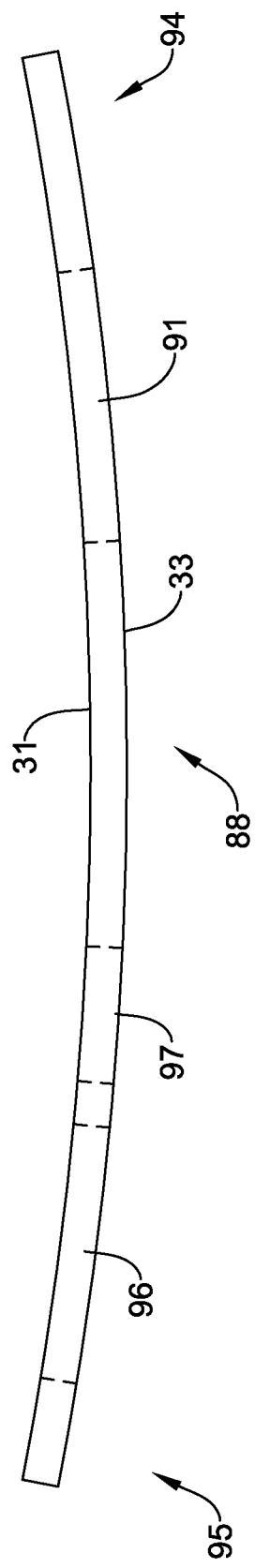
FIG. 16A is a side view of the catch arm shown in FIG. 15.

FIG. 16A illustrates a side view of the catch arm 88. FIG. 16 shows that, in some examples, the catch arm 88 may be bowed or curved along its length from the first end 94 to the second end 95. Thus, the catch arm 88 may include a concavely curved surface or face 31 on a first side of the catch arm 88, and a convexly curved surface or face 33 on an opposite second side of the catch arm 88. FIG. 16A illustrates an example radius of curvature for which the catch arm 88 may be curved and/or bowed. It can be appreciated that, depending on the particular flexural performance desired, the catch arm 88 may be bowed (e.g., curved) with a lessor or greater radius of curvature.

It can be appreciated that designing the catch arm 88 to include a curved shape may aid in securing the catch arm 88 to the pin 90 of the upper beam 30 and the pin 89 of the lower beam 32. For example, it can be appreciated that the catch arm 88 may be designed such that, when securing the catch arm 88 to the upper beam 30 and the lower beam 32 (via engagement of the pin 90 within the aperture 91 and the pin 89 within the aperture 97), the catch arm 88 is oriented such that the first end 94 and the second end 95 each curve toward the side surface of the upper beam 30 and the lower beam 32 to which the catch arm 88 may be affixed with the concave surface 31 of the catch arm 88 facing the side of the lower beam 32.

Additionally, securing the catch arm 88 to the lower beam 32 may include flexing the first end 94 of the catch arm 88 away from the upper beam 30 when affixing the pin 90 within the aperture 91. It can be appreciated that the curve of the catch arm 88 (along the first end 94) will impart lateral flexural force on the surface of the upper beam 30 surrounding the pin 90 with the pin 90 inserted in the aperture 91. Additionally, it can be appreciated that the curve of the catch arm 88 (along the second end 95) will impart a force on the pin 89 and whereby the pin 89 imparts an equal and opposite force on the surfaces of the flanges of the catch arm 88 defining the aperture 97. It can be appreciated that the forces imparted by the curved catch arm 88 on the upper beam 30 around the pin 90 and on the beveled surfaces of the pin 89 may aid in securing the catch arm 88 to the lower beam 32. In other words, due to the curvature of the catch arm 88, the forces exerted on the catch arm 88 by the pin 89 and the upper beam 30 cause the catch arm 88 to flex away from its equilibrium curved state into a more straightened state, providing retention forces between the catch arm 88 and the upper and lower beams 30/32. These forces secure the catch arm 88 to the lower beam 32 via the pin 89.

Returning to FIGS. 12-13, it can further be appreciated that the ability of the first end 94 of the catch arm 88 to flex may aid in maintaining the handle assembly 22 in a given position while also permitting the handle to rotate between two positions, as shown and described above with respect to FIGS. 12-13. For example, FIGS. 12-13 illustrate that the upper arm 30 may include a raised boss 115 which is designed to engage the edges of the catch arm 88 along the first end 94. It can be appreciated that the engagement of the catch arm 88 with the raised boss 115 may maintain the upper beam 30 in a given position. For example, FIG. 12 illustrates the edge of the catch arm 88 closest to the brush 14 engaged with the raised boss 115, thereby maintain the upper beam in the locked or engaged position shown in FIG. 12. Because the first end 94 of the catch arm 88 is able to flex outwardly (away from the upper beam 30 and lower beam 32), a user may rotate the handle assembly 22 to a position as shown in FIG. 13. When the handle assembly 22 is rotated, the first end 94 of the catch arm 88 may flex outward such that the raised boss 115 may pass underneath the first end 94 of the catch arm 88 as the handle assembly 22 is rotated from the position shown in FIG. 12 to the unlocked or disengaged position shown in FIG. 13. It can be appreciated that after the raised boss 115 clears the first end 94 of the catch arm 88, the first end 94 may flex back toward the upper beam 30, whereby the edge of the catch arm 88 along the first end 94 which is farthest away from the brush 14 engages the raised boss 115. Engagement of the edge of the catch arm 88 along the first end 94 which is farthest away from the brush 14 may maintain the handle assembly in the configuration shown in FIG. 13.

Figure 17:
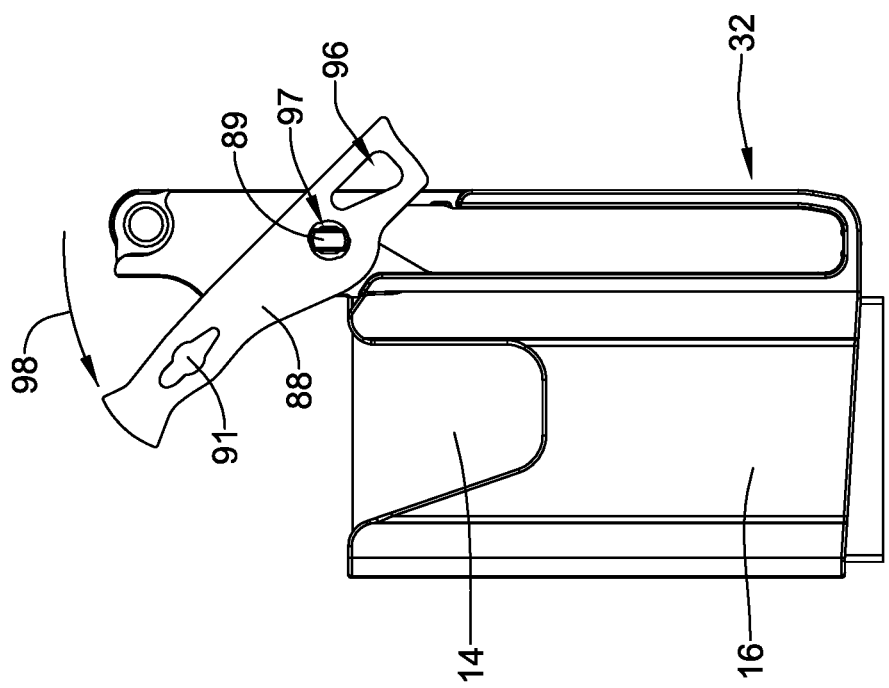
FIG. 17 illustrates an example step in removing the catch arm from the lower beam.

FIG. 17 illustrates an example step in the removal of the catch arm 88 from the lower beam 32. As indicated above, the catch arm 88 may be attached to the lower beam via the pin 89 (located on the lower beam 89) which engages the aperture 97 (located in the catch arm 88). It can be appreciated that, in some instances, the pin 89 may include a tapered conical surface which is designed to engage a mating conical surface located on the flanges of the aperture 97. Rotation of the aperture 97 around the pin 89 may permit the mating surfaces of the pin 89 and the aperture 97 "pull" the catch arm 88 toward an outer surface of the lower beam 32 when attaching the catch arm 88 to the upper beam 32 and thus resist movement of the pin 89 out of the aperture 97. Opposite rotation (indicated by arrow 98 in FIG. 17) may loosen the catch arm 88 from the lower beam 32. In other words, rotation of the catch arm 88 around the pin 89 may either engage or disengage the catch arm 88 to/from the upper beam 30 (depending on the direction of rotation).

Figure 18A:
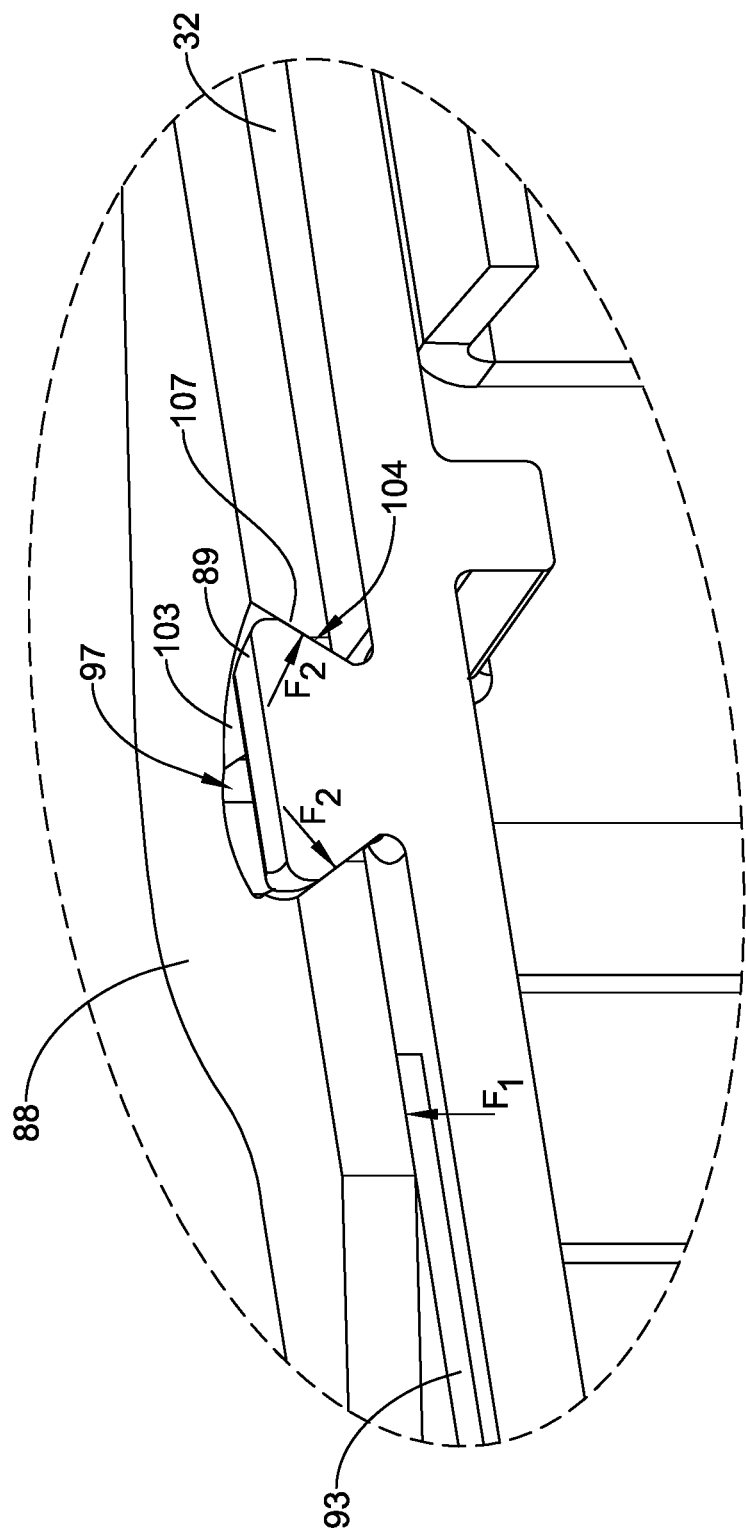
FIG. 18A illustrates a perspective cross-section taken along a portion of line 18-18 of FIG. 12.
Figure 18B:
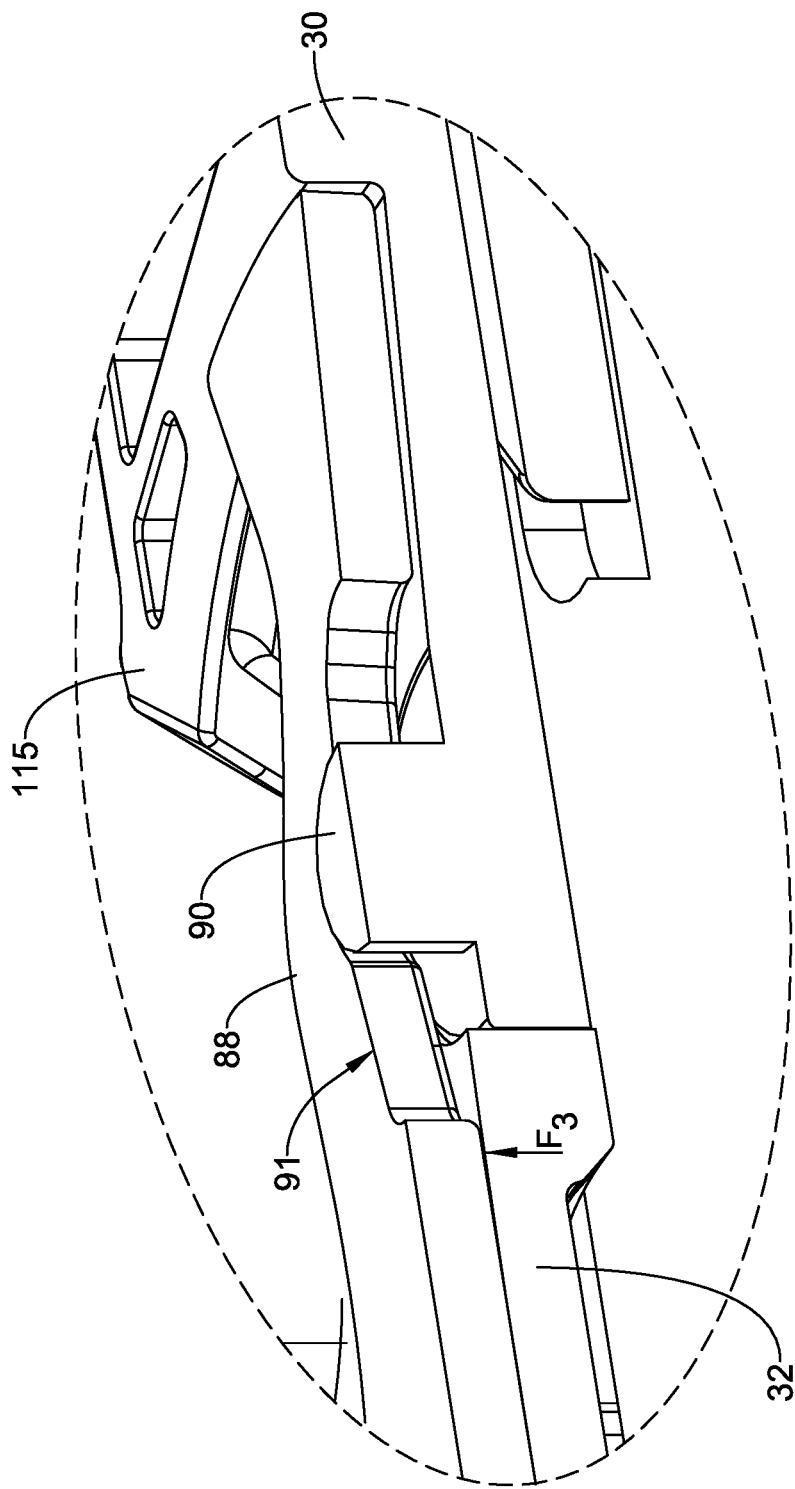
FIG. 18B illustrates a perspective cross-section taken along another portion of line 18-18 of FIG. 12.

FIGS. 18A and 18B illustrate perspective cross-sections taken along line 18-18 of FIG. 12. FIG. 18A shows the beveled surface 104 of the pin 89 engaged within the beveled surface 103 of the flanges of the aperture 97 of the lower beam 32. For example, FIG. 18A illustrates a force $F_2$ generated between the beveled surface 104 of the pin 89 and the beveled surface 103 of the flanges of the aperture 97. Additionally, FIG. 18A illustrates the cover plate 93 sandwiched between the back surface of the catch arm 88 and the lower beam 32. As discussed above (and illustrated in FIG. 18A), the cover plate 93 may include a curve which permits the cover plate 93 to press against the back surface of the catch arm 88 (shown as force $F_1$), thereby preventing the cover plate 93 from rattling and/or coming disengaged from the brush holder assembly 12. FIG. 18B illustrates the upper beam 30 exerting a force $F_3$ against the first end 94 of the catch arm 88, as the first end 94 of the catch arm 88 exerts an opposing force against the upper beam 30. The combination of forces secures the catch arm 88 to the lower beam 32 via the pin 89.

Figure 19:
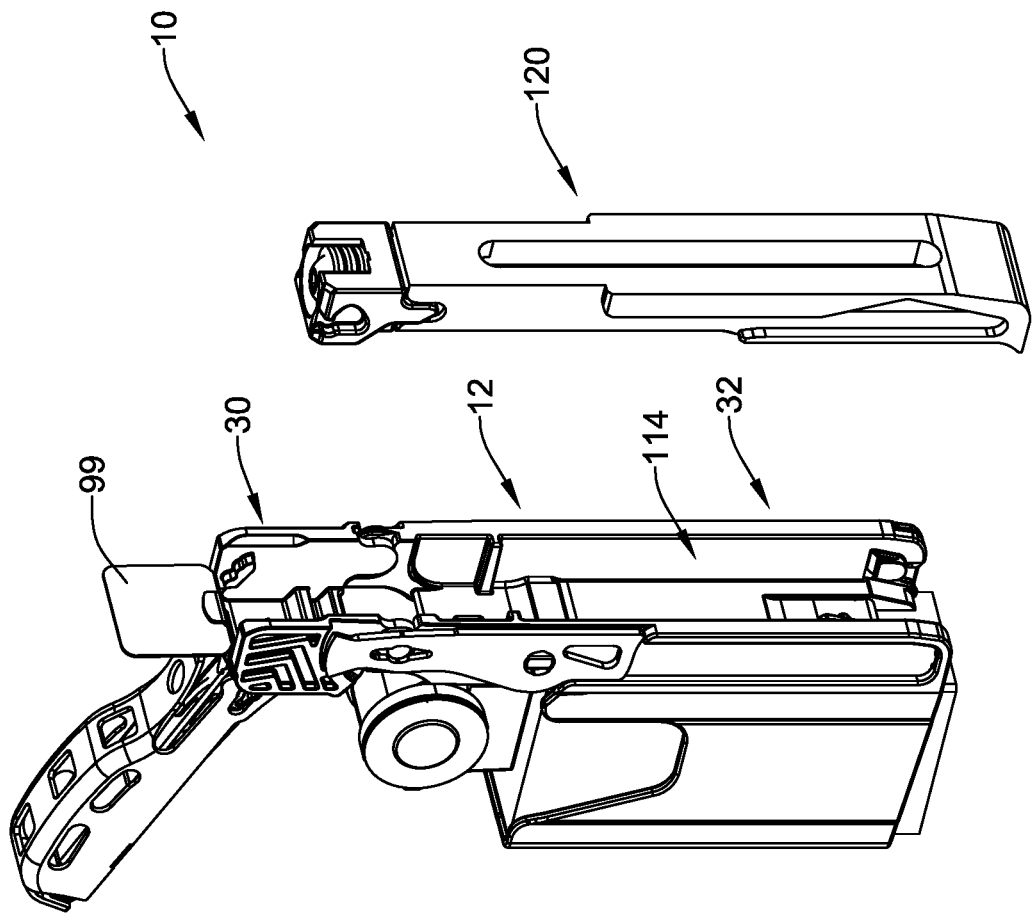
FIG. 19 is a perspective view of the exemplary brush holder assembly including an identification tab.

In some instances, it may be desirable to identify the brush holder assembly 12 from multiple brush holder assemblies positioned adjacent one another along an electrical device (not shown). One method of identifying the position of a particular brush holder assembly is to include an identification tag 99 on the brush holder assembly 12. For example, FIG. 19 illustrates an identification tag 99 attached to the upper beam 30. The identification tag 99 may include information such as the serial number, spatial location, order, etc. of the brush holder assembly 12.

Figure 20:
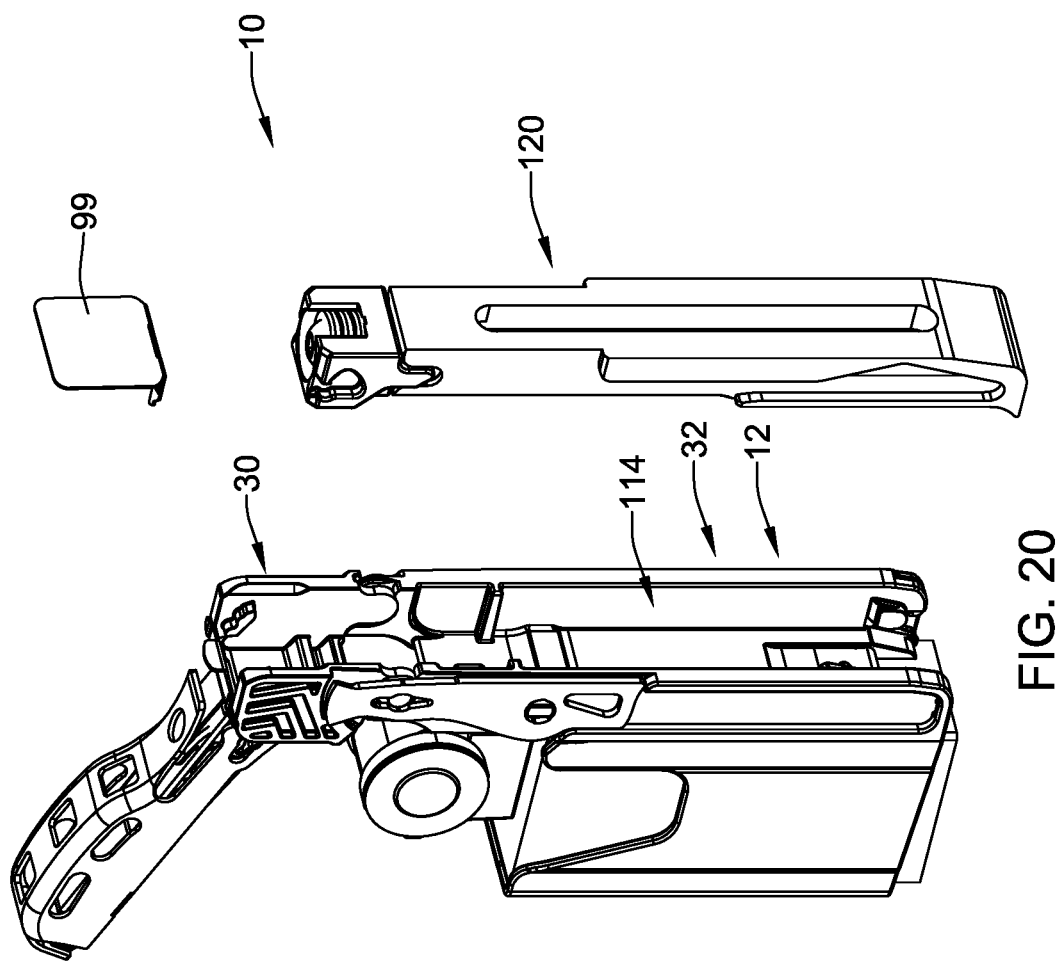
FIG. 20 is a perspective view of the exemplary brush holder assembly of FIG. 19 whereby the identification tab has been removed from the brush holder assembly.

In some instances, it may be beneficial to remove the identification tag 99 from the brush holder assembly 12. FIG. 20 illustrates that, in some examples, the identification tag 99 may be removable from and replaced after having been separated from the upper beam 30 of the brush holder assembly 12. It can be appreciated that the upper beam 30 may be configured to accept a tab or projection located on the identification tag 99, such that the identification tag 99 may be quickly removed and replaced on the upper beam 30.

FIGS. 19 and 20 also further illustrate the lower beam 32 and upper beam 30 may define a channel 114 configured to slidably receive the mounting block 120 thereon when the brush holder assembly 12 is mounted to the mounting block 120. Although not shown, the mounting block 120 may be bolted, welded, or otherwise secured to the electrical device to position the brush holder assembly 12 in proximity to a moving conductive surface.

Figure 21:
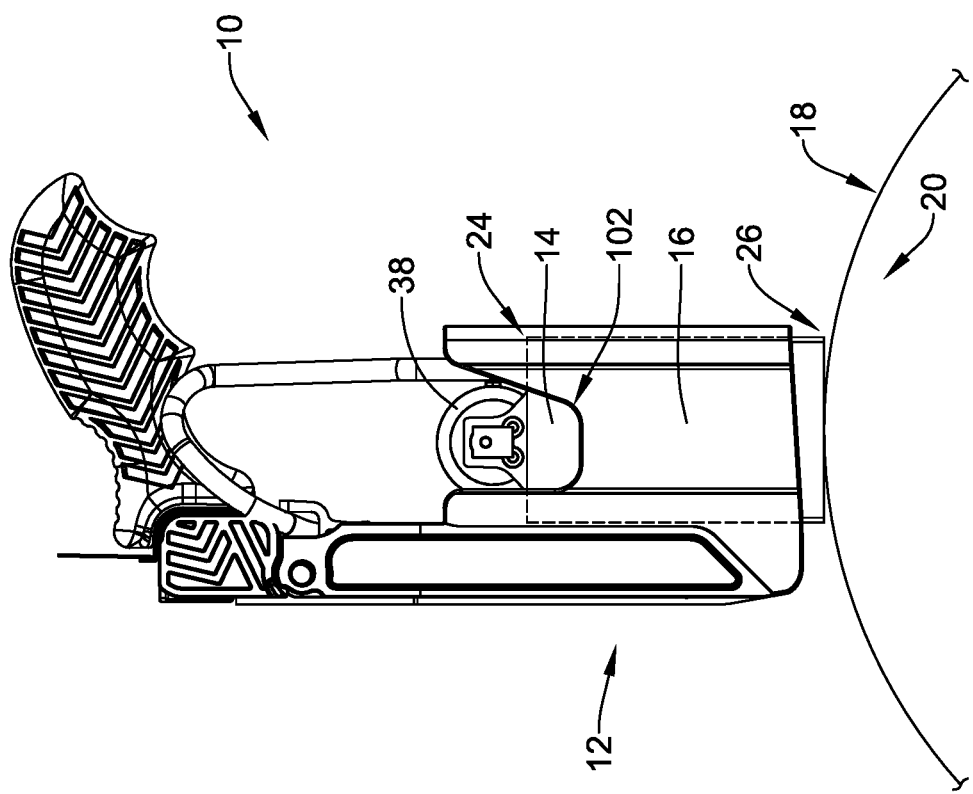
FIG. 21 illustrates a brush of the exemplary brush holder assembly translating within the brush holder of the brush holder assembly as the brush diminishes in length during use.

FIG. 21 illustrates a side view of the brush monitoring system 10 shown in FIG. 1, at a different temporal occasion representing a different identifiable wear state of the brush 14 after the brush has worn or diminished in length. FIG. 1 illustrates a first configuration (e.g., an initial wear state) of the brush 14 at an initial temporal occasion $T_0$, such as when the brush 14 of the brush monitoring system 10 is first installed on an electrical machine. FIG. 1 illustrates the brush 14 positioned within the brush holder 16 (as described above with respect to FIG. 1), with the lower surface 26 of the brush 14 engaged with the conductive surface 18 of the rotating component 20. FIG. 21 illustrates a second configuration (e.g., a second wear state) of the brush 14 at a later temporal occasion Ti, such as after the brush 14 has engaged the conductive surface 18 of the rotating component 20 over a period of time and has diminished in length.

FIG. 21 further illustrates that the brush holder 16 may include a cutout portion 102 which may be designed to improve the signal pick up capabilities of the wear state monitor 38 as the wear state monitor 38 translates within the brush holder 16. The wear state monitor 38 may be designed to wirelessly send signals regarding the wear condition of the brush 14 to a remote monitoring system. Accordingly, the wear state monitor 38 may need to wirelessly send and/or receive signals to and from the system 10. It can be appreciated that the material used to construct the brush holder 16 may interfere with the wear state monitor's 38 ability to receive or send the wireless signals. Hence, removing portions of the brush holder 16 which interfere with the wireless signals may improve the wear state monitor's 38 ability to receive and/or send wireless signals.

Figure 22:
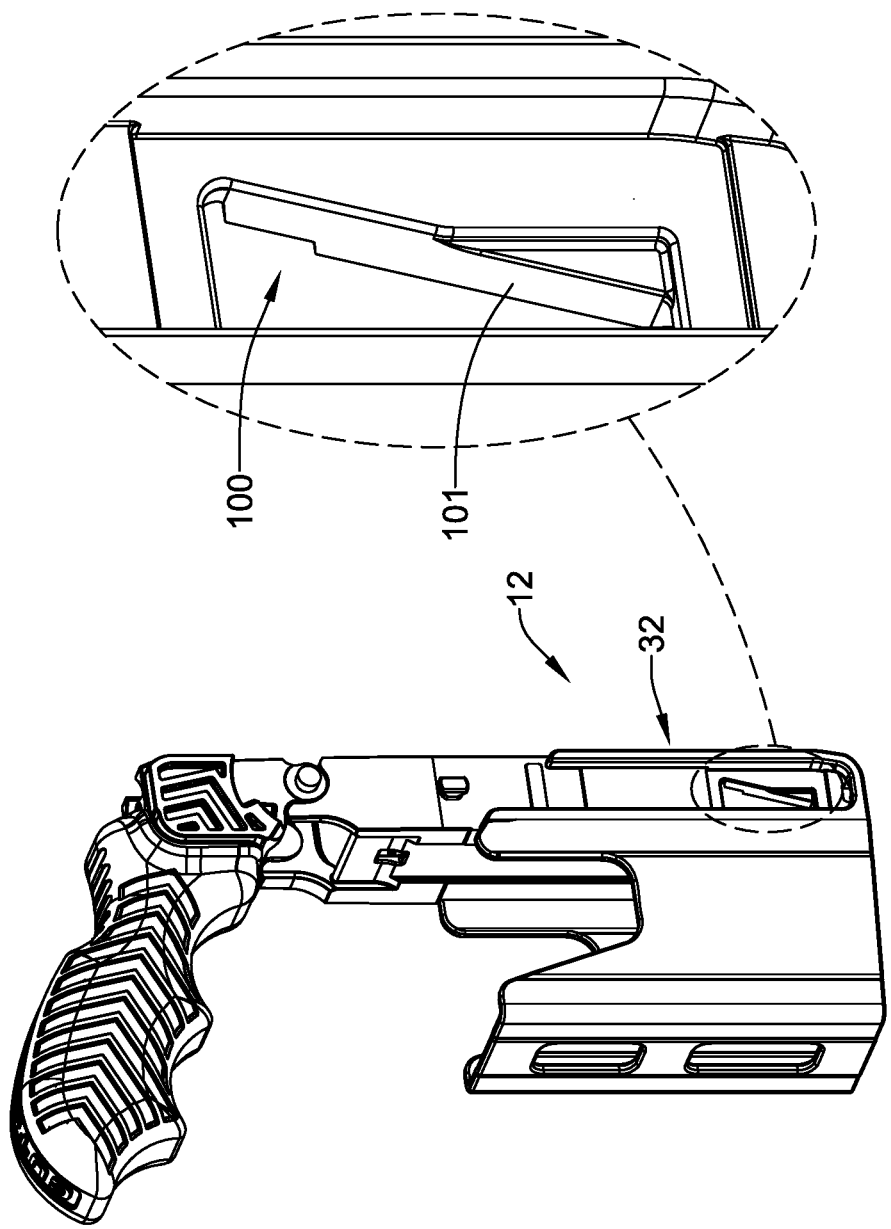
FIG. 22 illustrates a portion of the brush holder assembly.

FIG. 22 illustrates a perspective view of the brush holder assembly 12 described above. Further, the detailed view of FIG. 22 illustrates an aperture 100 located in the lower beam 32. The aperture 100 may utilized in the manufacturing steps of the brush holder assembly 12. Specifically, the aperture 100 may be utilized in manufacturing the angled face 101. For example, when constructing the brush holder 16, and particularly the lower beam 32, the aperture 100 may be utilized to form the face 101. Additionally, the face 101 may be a feature of the brush holder 16 which engages the mounting block (not shown in FIG. 22) described above. For instance, the lower beam 32 may be formed in a molding process. In molding the lower beam 32 in the molding process (such as a metal injection molding process) a first molding fixture may be used to form or define the channel 114 extending along the lower beam 32 and a second molding fixture may be used to form or define the face 101. Thus, the first molding fixture may be separate from, and thus separated from the second molding fixture such that the first and second molding fixtures can be removed from the molded lower beam 32 in separate, different directions. Upon molding the lower beam 32, the first molding fixture may be removed from the channel 114 independently of removing the second molding fixture through the aperture 100. It is noted that the cover plate 93 may cover the aperture 100 of the assembled brush holder assembly 12, concealing the aperture 100 from visibility on the assembled brush holder assembly 12.

Figure 23:
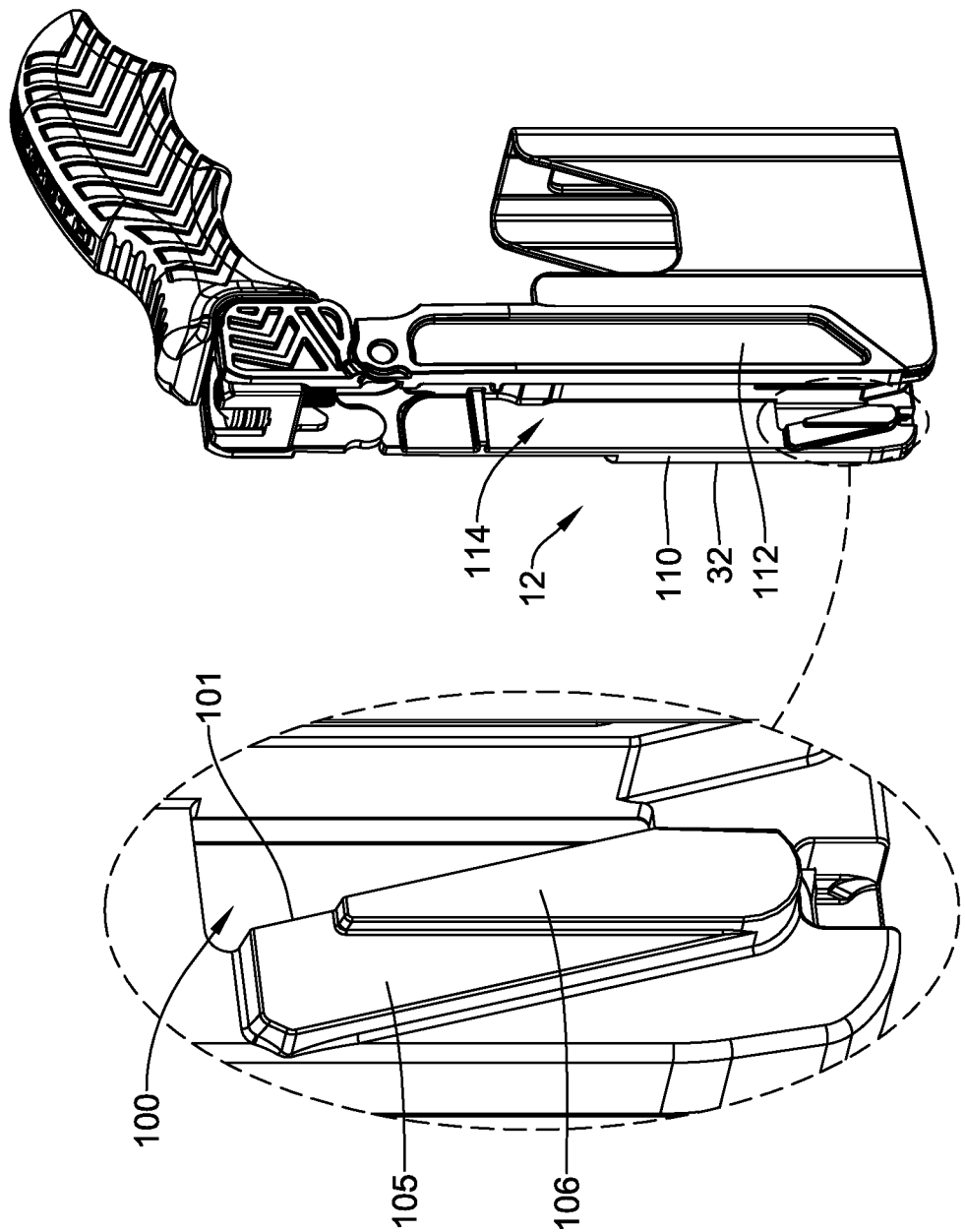
FIG. 23 illustrates a portion of the brush holder assembly.

FIG. 23 illustrates another perspective view of the brush holder assembly 12 described above. Specifically, the detailed view in FIG. 23 illustrates another view of the aperture 100 shown in FIG. 22. The lower beam 32 may include a first sidewall 110 and a second sidewall defining a channel 114 therebetween. The channel 114 is configured to removably receive a mounting block (not shown) to secure the brush holder assembly 10 to an electrical device. The aperture 100 may extend through the first sidewall 110 into the channel 114. FIG. 23 shows illustrates a first mounting feature 105 and a second mounting feature 106, wherein each of the first mounting feature 105 and the second mounting feature 106 are configured to engage the mounting block (not shown in FIG. 22) described above. The angled face 101 may be shared by both the first mounting feature 105 and the second mounting feature 106. The first mounting feature 105 and the second mounting feature 106, collectively, may be defined as an alignment boss which is designed to orient the brush holder 16 to a mounting block at an appropriate angle such that the upper beam 30 can properly align with the mounting block. Additionally, the first mounting feature 105 may be designed to permit the brush holder 16 to rotate into its final position when the brush holder assembly 12 is secured to the mounting block.

Those skilled in the art will recognize that aspects of the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A brush holder assembly, comprising:
   a lower beam;
   an upper beam pivotably coupled to the lower beam; and
   a removable catch arm including a first end region and a second end region;
   wherein the first end region of the catch arm is configured to removably attach to the upper beam;
   wherein the second end region of the catch arm is configured to removably attach to the lower beam; and
   wherein the upper beam is configured to be disassembled from the lower beam upon removal of the catch arm from the upper beam and the lower beam;
   wherein the catch arm further includes a first aperture positioned along the first end region of the catch arm, and wherein the first aperture is configured to receive a pin extending from the upper beam;
   wherein the catch arm further includes a second aperture positioned along the second end region of the catch arm, and wherein the second aperture is configured to receive a pin extending from the lower beam.

2. The brush holder assembly of claim 1, wherein the second aperture includes a tapered surface, and wherein the pin extending from the lower beam includes a tapered surface configured to mate with the tapered surface of the second aperture.

3. The brush holder assembly of claim 2, wherein the second aperture is non-circular, wherein the pin extending from the lower beam is extendable through the second aperture in a first rotational orientation, but is prevented from extending through the second aperture in a second rotational orientation different from the first rotational orientation.

4. The brush holder assembly of claim 1, further comprising a cover plate extending along a side surface of the lower beam, the cover plate including a first end region positioned between the second end region of the catch arm and the side surface of the lower beam, wherein the end region of the cover plate exerts a lateral outward force against a rear surface of the catch arm.

5. A brush holder assembly, comprising:
an upper beam;
a lower beam pivotably coupled to the upper beam;
a brush holder attached to the lower beam, the brush holder configured to slidably receive a carbon brush therein;
a removable catch arm including a first end region and a second end region, wherein the first end region of the catch arm is configured to attach to the upper beam, and wherein the second end region of the catch arm is configured to attach to the lower beam;
wherein the catch arm includes a first aperture positioned along the first end region of the catch arm and a second aperture positioned along the second end region of the catch arm, wherein the first aperture is configured to receive a pin extending from the upper beam, and wherein the second aperture is configured to receive a pin extending from the lower beam;
wherein the upper beam is configured to be repeatedly assembled and disassembled from the lower beam;
wherein the lower beam includes a first sidewall and a second sidewall defining a channel therebetween, the channel configured to removably receive a mounting block to secure the brush holder assembly to an electrical device;
wherein the first sidewall includes an opening extending through the sidewall into the channel.

6. The brush holder assembly of claim 5, further comprising:
a cover plate extending along the first sidewall of the lower beam, the cover plate including a first end region positioned between the second end region of the catch arm and the first sidewall of the lower beam;
wherein the cover plate extends across the opening of the first sidewall.

7. A brush holder assembly, comprising:
a lower beam;
an upper beam pivotably coupled to the lower beam;
a removable catch arm including a first end region and a second end region; and
a cover plate extending along a side surface of the lower beam, the cover plate including a first end region positioned between the second end region of the catch arm and the side surface of the lower beam;
wherein the first end region of the catch arm is configured to attach to the upper beam; and
wherein the second end region of the catch arm is configured to attach to the lower beam; and
wherein the end region of the cover plate exerts a lateral outward force against a rear surface of the catch arm.

8. The brush holder assembly of claim 7, wherein the catch arm further includes a first aperture positioned along the first end region of the catch arm, and wherein the first aperture is configured to receive a pin extending from the upper beam.

9. The brush holder assembly of claim 8, wherein the catch arm further includes a second aperture positioned along the second end region of the catch arm, and wherein the second aperture is configured to receive a pin extending from the lower beam.

10. The brush holder assembly of claim 9, wherein the second aperture includes a tapered surface, and wherein the pin extending from the lower beam includes a tapered surface configured to mate with the tapered surface of the second aperture.

11. The brush holder assembly of claim 10, wherein the second aperture is non-circular, wherein the pin extending from the lower beam is extendable through the second aperture in a first rotational orientation, but is prevented from extending through the second aperture in a second rotational orientation different from the first rotational orientation.

12. A brush holder assembly, comprising:
an upper beam;
a lower beam pivotably coupled to the upper beam;
a brush holder attached to the lower beam, the brush holder configured to slidably receive a carbon brush therein;
a removable catch arm including a first end region, a second end region, a first aperture positioned along the first end region of the catch arm, and a second aperture positioned along the second end region of the catch arm;
wherein the first aperture is configured to receive a pin extending from the upper beam to attach the first end region of the catch arm to the upper beam;
wherein the second aperture is configured to receive a pin extending from the lower beam to attach the second end region of the catch arm to the lower beam;
wherein the lower beam includes a first sidewall and a second sidewall defining a channel therebetween, the channel configured to removably receive a mounting block to secure the brush holder assembly to an electrical device;
wherein the first sidewall includes an opening extending through the sidewall into the channel; and
a cover plate extending along the first sidewall of the lower beam, the cover plate including a first end region positioned between the second end region of the catch arm and the first sidewall of the lower beam;
wherein the cover plate extends across the opening of the first sidewall.

* * * * *